(12) United States Patent
Sengupta et al.

(10) Patent No.: US 7,459,167 B1
(45) Date of Patent: Dec. 2, 2008

(54) BIOCIDAL POLYURETHANE COMPOSITIONS AND METHODS OF USE

(75) Inventors: Ashok Sengupta, London (CA); Jeffrey L. Jacobs, Stillwater, MN (US); Matthew T. Scholz, Woodbury, MN (US); Kestutis J. Tautvydas, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/626,026

(22) Filed: Jul. 27, 2000

(51) Int. Cl.
*A01N 25/10* (2006.01)

(52) U.S. Cl. ............... 424/405; 424/78.37; 523/122

(58) Field of Classification Search ............... 424/404, 424/405, 411, 78.09, 76.08, 78.18, 78.27, 424/78.37; 524/89, 839, 840; 528/44–85
See application file for complete search history.

(56) References Cited

U.S. PATENT DOCUMENTS

| | | | |
|---|---|---|---|
| 3,844,989 A | | 10/1974 | Harumiya et al. |
| 3,931,319 A | | 1/1976 | Green et al. |
| 4,025,617 A | | 5/1977 | Green et al. |
| 4,110,286 A | | 8/1978 | Vandegaer et al. |
| 4,192,937 A | | 3/1980 | Noll et al. |
| 4,247,476 A | * | 1/1981 | Haase et al. .............. 564/51 |
| 4,269,748 A | | 5/1981 | Nachtkamp et al. |
| 4,292,226 A | | 9/1981 | Wenzel et al. |
| 4,451,635 A | * | 5/1984 | Gould et al. .............. 528/71 |
| 4,532,128 A | | 7/1985 | Sheldon et al. |
| 4,567,302 A | | 1/1986 | Sivaramakrishnan |
| 4,781,974 A | | 11/1988 | Bouchette et al. |
| 5,013,459 A | | 5/1991 | Gettings et al. |
| 5,061,485 A | | 10/1991 | Oakes et al. |
| 5,084,096 A | | 1/1992 | Stovicek |
| 5,145,596 A | | 9/1992 | Blank et al. |
| 5,352,833 A | | 10/1994 | Merianos |
| 5,358,688 A | | 10/1994 | Robertson |
| 5,408,022 A | | 4/1995 | Imazato et al. |
| 5,494,987 A | | 2/1996 | Imazato et al. |
| 5,569,732 A | | 10/1996 | Nohr et al. |
| 5,585,407 A | | 12/1996 | Patel et al. |
| 5,789,461 A | | 8/1998 | Nicolson et al. |
| 5,954,869 A | | 9/1999 | Elfersy et al. |
| 6,194,530 B1 | * | 2/2001 | Klesse et al. .............. 526/312 |
| 6,440,405 B1 | * | 8/2002 | Cooper et al. ............ 424/78.17 |

FOREIGN PATENT DOCUMENTS

| | | |
|---|---|---|
| DE | 196 46 965 | 6/1998 |
| EP | 0 355 765 | 8/1989 |
| FR | 2 342 740 | 9/1977 |
| FR | 2 686 610 | 7/1993 |

OTHER PUBLICATIONS

The Journal of the American Chemical Society, An Apparatus for Determining Both the Quantity of Gas Evolved and the Amount of Reagent Consumed in Reactions with Methyl Magnesium Iodide, vol. XLIX, Jul.-Dec. 1927, By E.P. Kohler, J.F. Stone, Jr., and R.C. Fuson.
Journal of Polymer Research, "Biocidal Polyuretyhane and Its Antibacterial Properties", vol. 5, No. 3, Jul. 1998, by Huei-Hsiung Wang and Meei-Show Lin.
Journal of Applied Polymer Science, Biocidal Polymers Active by Contact. I. Synthesis of Polybutadiene with Pendant Quaternary Ammonium Groups, vol. 50, 1993, By J. Hazziza-Laskar, N. Nurdin, G. Helary, and G. Sauvet.
U.S. Appl. No. 09/626,028, filed Jul. 27, 2000.
U.S. Appl. No. 09/627,110, filed Jul. 27, 2000.
U.S. Appl. No. 09/626,810, filed Jul. 27, 2000.
U.S. Appl. No. 09/627,121, filed Jul. 27, 2000.
U.S. Appl. No. 09/627,785, filed Jul. 27, 2000.
U.S. Appl. No. 09/626,812, filed Jul. 27, 2000, Aqueous Colloidal Dispersions of Sulfonated Polyurethane Ureas and Products.

* cited by examiner

*Primary Examiner*—Neil Levy
(74) *Attorney, Agent, or Firm*—Colene H. Blank

(57) ABSTRACT

Polymeric compositions that include polyurethane polymers derived from a polyisocyanate compound and a polyactive hydrogen compound. The polyurethane compound is at least partially endcapped with a group including at least one antimicrobial quaternary ammonium compound. The polymeric composition of the present invention is capable of forming a self-supporting film. The polymeric compositions are suitable for coating substrates to effectively kill or prevent the growth of microorganisms such as bacteria, mold, mildew, algae fungi and the like. The polymeric compositions are particularly useful for protecting construction materials used in moist, outdoor environments to prevent discoloration or decay from microorganisms and for surfaces in health care facilities to mitigate the spread of pathogens.

8 Claims, No Drawings

BIOCIDAL POLYURETHANE COMPOSITIONS AND METHODS OF USE

The present invention relates to biocidally active polyurethane polymers having pendant quaternary ammonium salts that can be applied to a surface, incorporated into a composition, or both to inhibit the growth of microorganisms such as Gram positive and Gram negative bacteria, fungi and algae.

BACKGROUND OF THE INVENTION

The control of microorganisms such as bacteria, mold, mildew and algae in humid environments or on moist surfaces has long been a matter of concern. Biocidal compositions containing phenols, iodine, or quaternary ammonium compounds and heavy metals such as tin and mercury have been used, but these suffer from the drawback of lacking permanence and must be reapplied periodically to maintain protection. In addition, many of these compounds are toxic to higher forms of life. Polymeric coatings entrapping a biocide which is slowly released upon wetting the coated surface are described in the patent literature by Oakes et al., U.S. Pat. No. 5,061,485 and Patel et al., U.S. Pat. No. 5,585,407. The coatings are generally acrylate copolymers that have functional groups to improve the quality of the coating or facilitate its removal. Although the duration of protection is extended, the biocide is leached from these coatings and the coating must be renewed periodically to maintain its biocidal properties. Further, if coatings with releasable antimicrobial compounds are used on outdoor surfaces such as roofing felts or lumber, the antimicrobial substance may be released to the environment with potential adverse effects to desirable flora and fauna.

Various attempts have been made to overcome these deficiencies by chemically bonding the active antimicrobial substance to the polymeric coating. Polysiloxane polymers having pendant quaternary ammonium salts are disclosed by Nohr, et al., U.S. Pat. No. 5,569,732 and Gettings et al., U.S. Pat. No. 5,013,459. The polymers disclosed in these patents have been applied to fibers, non-woven fabrics and glass or ceramic surfaces. Polymers and copolymers from vinyl benzene having quaternary ammonium salt groups have been disclosed by Sheldon et al., U.S. Pat. No. 4,532,128 for use with various medical and personal care products.

Polyurethane coatings having biocidal properties were reported by Nurdin, et al., *Journal of Applied Polymer Science*, vol. 50, 651 (1993). The polyurethanes were made from dihydroxytelechelic polybutadienes to which quaternary ammonium tetramethyldisiloxanes had been grafted before forming the urethane polymer. The Nurdin et al. polyurethanes are highly functional and form crosslinked, thermoset materials. Similarly, Wang and Lin, *Journal of Polymer Research*, vol. 5, 177 (1998), reported antimicrobial fabric finishes made from polyurethanes to which quaternary ammonium siloxanes had been attached through epichlorohydrin grafted to the polymer chain. Wang and Lin use dimethylformamide to form solutions for applying their polyurethanes to a substrate. In these references rather complex and relatively expensive chemistries are used to attach quaternary ammonium groups to a polyurethane polymer.

Polymerizable compositions having acrylate monomers with pendant quaternary ammonium groups are described by Imazato et al., U.S. Pat. Nos. 5,408,022 and 5,494,987. The Imazato compositions provide an unreleasable antimicrobial polymer useful for applying to the surface of medical articles, in general, and as a restorative material for dental caries, in particular. Various crosslinkable copolymer compositions are described. A polyurethane having an acrylate group at each of its molecular ends is used as a difunctional crosslinking agent for the acrylate polymers and allows properties of the acrylate polymers, such as, hardness, strength and thermal resistance of the antimicrobial polymer to be varied according to the requirements of the intended use. These materials are completely endcapped. Based on the disclosed chemistry, these compositions do not form an aqueous dispersion and when applied as a coating are cured or polymerized on the surface.

Biocidally active coating compositions having pendant quaternary ammonium groups are described by Stovicek, U.S. Pat. No. 5,084,096 for treating surfaces submerged in sea water, construction materials intended for outdoor use, environmental surfaces in health care facilities and for treating the ducts of HVAC systems. Coating compositions are disclosed which incorporate repeating units of a diol monomer having an alkyl or arylalkyl quaternary ammonium group directly bonded by an alkylene group to the backbone of polyester, polyether, and polyurethane polymers. The diol monomers have limited utility with respect to polymer formation which in turn limits the ability to vary the properties of polymer coatings.

The polymers of the present invention are relatively easy to make in a pure form with a low level of residual, extractable material, and preferably with no residual, extractable material. The prior art fails to teach polyurethane coating compositions having immobilized or bound biocidal quaternary groups and that have the added capability to vary the polymer structure to adapt the properties of the coating to particular uses. In addition, the prior art fails to teach film forming polyurethane polymers having covalently bound polymer groups derived from polymerization of vinylic monomers which at least in part comprise biocidal quaternary ammonium groups. Further, the prior art does not teach polyurethane coating compositions having bound biocidal quaternary ammonium groups that can form aqueous dispersions or solutions thus eliminating the need to use potentially flammable and toxic solvents.

SUMMARY OF THE INVENTION

In describing aspects of the invention certain terms will have the meaning defined herein.

"Active Hydrogen" refers to a moiety (compound or functional group) which displays significant activity according to the Zerewitnoff test described by Woller in the *Journal of the American Chemical Society*, vol. 49, page 3181 (1927). Illustrative of such active hydrogen moieties are hydroxyl groups, primary and secondary amines, mercaptans and the like. A single compound may have multiple active hydrogens of the same or different functional groups.

"Chain Extender" as used herein means a polyactive hydrogen compound having a functionality of about 2 to 4, more preferably 2 to 3, and most preferably about 2 and generally having a molecular weight of about 30 to 2000, preferably 30 to 1000. Preferred chain extenders are polyfunctional alcohols, amines, or carboxylic acid hydrazides. Chain extending is synonymous with chain lengthening.

"Polyol" and "polyactive hydrogen compound" refer to a polyfunctional compound having more than one active hydrogen moiety capable of a reaction with an isocyanate moiety.

"Monol" refers to a compound having a single active hydrogen moiety capable of a reaction with an isocyanate moiety to form a urethane, urea, thiourethane, thiourea, or similar moiety. It should be noted that the compound is "monofunctional" with respect to its reactivity toward isocyanate. Therefore, compounds such as hydroxyethylacrylate which have two reactive groups (vinyl and hydroxyl) only one of which is reactive with isocyanate are still termed monofunctional.

"Polyurethane" refers generally to the reaction product of a polyisocyanate and a polyol.

"Dispersed or dispersion" as used herein means generally a two phase system wherein one phase comprises finely divided particles distributed throughout a second phase, which is a bulk substance. The particles are the disperse or internal phase, and the bulk substance the continuous or external phase. In this invention, the continuous phase is water or an aqueous mixture. By "dispersion," it is also meant that not necessarily the entire polyurethane polymer needs to be water insoluble; at least some of the polymer can be soluble in the continuous phase.

"Biocidal" and "antimicrobial" refer to the ability of any composition contemplated by the invention to inhibit the growth of or to kill microorganisms such as without limitation bacteria, fungi, mildew, mold, and algae.

"Solution" as used herein refers to materials which are soluble in the solvent phase such that they form homogenous single phase.

"Substrate" refers to any surface to which a composition contemplated by the invention is applied.

"Pendant" refers to moieties covalently bound to any polyurethane polymer contemplated by the invention.

"Polyol vinylic compound" as used herein refers to a single compound bearing both vinyl and at least two active hydrogen functional groups.

"Monol vinylic compound" as used herein refers to a single compound having a single active hydrogen group and at least one vinyl group ($CH_2=CH-$).

"Self-supporting film" means that when the composition is dried down onto a release liner of suitably low surface energy the film so formed once removed from the release liner is capable of supporting its own weight.

The present invention provides polymeric compositions that include polyurethane polymers derived from a polyisocyanate compound and a polyactive hydrogen compound. The polyurethane compound is at least partially endcapped with a group including at least one antimicrobial quaternary ammonium compound. Preferred polymeric water insoluble compositions of the present invention are capable of forming a self-supporting film.

The polyurethane polymers of the present invention can be applied to a substrate to provide long lasting protection from the growth of microbes such as bacteria, mold, mildew, fungi and algae. The preferred antimicrobial polyurethane polymers are water dispersible or soluble and may be applied either as an aqueous solution or preferably as an aqueous dispersion. Alternatively, they may be applied from pure or mixed solvent systems in dispersion or solution form. Certain water insoluble compositions of the invention may be applied to a substrate, and will form protective adherent polymeric films upon drying. The dispersions from the present invention are capable of forming films at ambient temperature. The tack free time of the films (i.e. time after which films do not transfer any mass and exhibit no tacky feeling when lightly touched by the finger) depends on the temperature, humidity and on the thickness of the films. Coatings which dry to form thin films about 0.06 mm are tack free within one hour, whereas coatings which form thick films, about 0.14 mm are tack free in about one and half hour at around 50% humidity at 25C. The water insoluble polymeric films are abrasion resistant with excellent adhesion to a wide variety of substrates including wood, metal, ceramic, fiber and fabric without detracting from appearance.

The polyurethane polymers derive their antimicrobial properties from an effective amount of covalently bound, antimicrobially active quaternary ammonium groups pendant to the polyurethane polymer in either terminal or intermediate positions along the polymer chain or backbone. In one embodiment the pendant antimicrobial quaternary ammonium groups can occur as side chains along the polyurethane polymer backbone. In another embodiment the pendant quaternary ammonium groups may be in the terminal positions. In still another embodiment the antimicrobial quaternary ammonium groups may occur as side chains along the polyurethane polymer backbone and also in the terminal positions. The polymers may be linear or branched and may have additional functional groups such as aromatic polyols, alkane polyols, polysiloxane polyols to improve hydrolytic resistance and adhesion. Cationic or nonionic groups and combinations thereof can be incorporated into the polyurethane polymers to aid aqueous dispersibility. Aqueous dispersions are preferred as they contain little or no organic solvent which could contribute volatile substances having an adverse effect on air quality and on individuals using the invention.

In certain embodiments the quaternary ammonium group are covalently bound to water insoluble polymeric backbones making the antimicrobial non-leaching and thus providing persistent antimicrobial protection to a surface to which it is applied. This eliminates the need to periodically replenish the antimicrobially active substance for the life or the coating. Further, by immobilizing the antimicrobial substance as part of the coating, there is no release of potentially harmful substances to the environment during use. This is particularly desirable if the coating is used outdoors or if a particular use is likely to result in contact with humans or other higher life forms.

The polyurethane polymers of the invention most conveniently are prepared by forming a polyurethane pre-polymer from polyisocyanates and polyactive hydrogen compounds which is chain extended to increase molecular weight. The active hydrogen compounds may include quaternary ammonium compounds having one or more hydroxyl groups, a vinylic monol, or a vinylic polyol. Pre-polymers having pendant vinylic groups may be further polymerized with a vinylic monomer having antimicrobial quaternary ammonium functionality as well as other non-quaternary ammonium containing vinylic monomers. In preferred embodiments the polyurethane pre-polymer is partially endcapped (i.e. chain terminated) by reaction with a compound comprising an antimicrobial quaternary ammonium group. Suitable antimicrobial quaternary ammonium groups include mono-active hydrogen functional quaternary antimicrobial compounds or a vinylic monol that is subsequently reacted with a compound comprising a vinylic group and an antimicrobial quaternary ammonium group (e.g. by free radical polymerization). The molecular weight of the polyurethane prepolymer is increased by reaction of remaining isocyanate groups with a chain extender. Chain extension can occur before, after, or concurrent with incorporation of the quaternary ammonium group. Preferred chain extenders include polyactive active hydrogen compounds such as dihydrazide dicarboxylic acids, polyols, and polyamines.

The present invention also contemplates a method for preventing the growth of microorganisms on a substrate comprising applying to the substrate an aqueous dispersion of a biocidal polyurethane polymer comprising biocidal quaternary ammonium groups covalently bound and pendant to the polymer as described herein.

DETAILED DESCRIPTION OF THE INVENTION

The preferred embodiments of the invention are described below in detail with the components of the polymeric compositions. Polymers are frequently classified according to their polymerization method as either step-growth-type or addition-type. Addition polymerization proceeds by chain addition reactions of unsaturated monomers wherein the locus of polymerization is an active propagating center located on relatively few growing polymer chains. Once a growing polymer chain achieves a molecular weight characteristic of the particular polymerization reaction, polymerization of that chain ends and a new chain is initiated. A vinylic compound normally forms polymers by addition polymerization. Step-growth polymerization, on the other hand, proceeds by stepwise reactions and involves all growing polymer chains simultaneously. Dimers, trimers, tetramers, etc are formed and only late in the reaction is a high molecular weight polymer achieved. Polyurethane polymers are typically formed by a stepwise polymerization between a polyisocyanate compound and a polyol compound. This characteristic provides considerable flexibility in choosing monomers and their order of addition to impart desirable properties to the final polymer. Polymers with widely varying properties from very abrasion resistant hard materials to soft and elastic products can be formed as well as polymers which vary from water soluble to extremely water insoluble.

The claimed invention provides polyurethane compositions having antimicrobial quaternary ammonium groups covalently bound to the polymer. The antimicrobial quaternary ammonium groups are bound to the polyurethane backbone either at the terminal positions through the use of monols comprising quaternary ammonium groups, at the terminal positions through the use of vinylic monols reacted onto the terminal positions that have been further addition polymerized with a compound comprising both a polymerizable unsaturated group and an antimicrobial quaternary ammonium group, as side chains along the polyurethane backbone through the use of vinylic polyols reacted into the polyurethane backbone that have been addition polymerized with a compound comprising both a polymerizable unsaturated group and an antimicrobial quaternary ammonium group, or combinations thereof. One skilled in the art is capable of choosing the method or mechanism of polymerization in order to vary the physical properties of a polymer coating. Thus the method or mechanism of polymerization can be selected to tailor the properties of the polyurethane to specific end-use requirements while maintaining biocidal efficacy.

While not intending to be bound by theory, the inventors presently believe that placement of the quaternary ammonium groups pendant to the polyurethane backbone at least in part is responsible for the surprisingly high level of antimicrobial activity of the present invention.

For example, in one reaction scheme contemplated by the claimed invention, a conventional prepolymer having terminal isocyanate groups is formed from a polyisocyanate and a polyol. The ratio of equivalents of isocyanate to equivalents of active hydrogen is generally greater than 1.6, preferably greater than 1.8 and most preferably greater than 1.9. Certain applications may have a equivalent ratio of isocyanate to active hydrogen of 2.0 to as high as 3.0 or more. For applications where a lower modulus and/or higher flexibility and elongation is desired, the equivalent ratio is generally kept lower, e.g. less than 2.5, more preferably less than about 2.2 and most preferably less than about 2.0. For very flexible higher elongation materials the ratio may be as low as 1.8 or less. For application where harder coatings are desirable, a ratio greater than about 2.5 is preferred. In certain embodiments a monol compound containing a biocidal quaternary ammonium group is reacted with at least a portion of the reactive isocyanate groups of the prepolymer wherein the equivalent ratio of isocyanate groups to monol group is greater than one. The prepolymer having biocidal quaternary ammonium groups pendant thereto can be combined with chain lengthening compounds to provide polyurethane polymers capable of forming surface coatings.

In another reaction scheme contemplated by the claimed invention, a prepolymer is again made according to conventional methods. A polyol compound having a vinylic functionality undergoes a reaction with the excess isocyanate groups of the prepolymer to provide vinylic groups pendant along the polymer backbone which are capable of further reaction with a vinylic monomer having a biocidal quaternary ammonium group. The resulting polyurethane can be chain lengthened to provide a polyurethane polymer with biocidal properties.

In still another reaction scheme contemplated by the claimed invention, an isocyanate functional polyurethane prepolymer as described above undergoes a reaction with a monol compound having vinylic functionality. The vinylic monol adds at the ends of the polyurethane backbone (i.e. end caps) to provide a vinylic functionality capable of further reaction with vinylic monomers such as vinyl monomers having an antimicrobial quaternary ammonium group. When difunctional isocyanates and diols are used along with difunctional chain extenders the amount of monol is conveniently expressed as the ratio of active hydrogen on the monol to isocyanate on the isocyanate functional prepolymer (without chain extension). In this case, the amount of monol is less than 40 mole %, preferably less than 25 mole % and most preferably less than 20 mole % of the isocyanate functional prepolymer present. In order to ensure sufficient vinylic groups for attachment of antimicrobial quaternary ammonium groups, however, the amount of vinyl monol is preferably greater than 2.5 mole %, more preferably greater than 5 mole % and most preferably greater than about 10 mole % of the isocyanate functional prepolymer.

In a further reaction scheme contemplated by the claimed invention, a polyol compound having vinylic functionality undergoes a reaction with a polyisocyanate to form a polyurethane prepolymer having excess isocyanate groups. A monol having a quaternary ammonium group may be added to at least a portion of the residual isocyanate groups. This intermediate polymer has vinylic functionality which can be combined with a quaternary ammonium compound having vinylic functionality by means of addition polymerization. The resulting isocyanate functional polyurethane can be chain lengthened to provide a polyurethane polymer with biocidal properties. It should be noted that the chain lengthening (i.e. chain extension) step can be performed before or after the vinyl polymerization. The inventors presently prefer to conduct the chain extension step followed by the vinyl polymerization reaction.

Numerous other variations of the composition, features and advantages of the present invention will become readily apparent from the following description of materials, examples, and the claims.

Polyurethane Polymers

Polyurethane polymers are the reaction product of a polyol or blend of polyols with a polyisocyanate or a blend of polyisocyanates. Polyurethane polymers can be formed in one or more reaction steps. If multiple steps are used, an isocyanate functional prepolymer is initially formed which can undergo further reaction with the same or different polyols or monols to provide polyurethane polymers suitable as protective coatings. The inventors also recognize the possibility of forming an active hydrogen functional prepolymer followed by reaction with the same or different isocyanates to form the polyurethane polymer. The polyols and monols incorporated into the prepolymer can have additional functionality such as an antimicrobial quaternary ammonium group or a vinylic group suitable for further reaction. The following description of materials is exemplary of suitable materials for making polyurethane prepolymers and polymers of the invention and are not exhaustive of materials capable of such use.

Suitable polyisocyanates include organic compounds containing at least two free isocyanate groups. Diisocyanates of the formula $D(NCO)_2$ are preferably used wherein D denotes an aliphatic hydrocarbon group with 4 to 20 carbon atoms, a cycloaliphatic hydrocarbon group with 6 to 20 carbon atoms, an aromatic hydrocarbon group with 6 to 20 carbon atoms or an araliphatic hydrocarbon group with 7 to 20 carbon atoms. Diisocyanates (as well as difunctional polyactive hydrogen compounds) are preferred in order to ensure that the Final polymer formulations are capable of forming films upon drying. If the crosslink density is too high film formation will not be possible. Preferred polymer solution or dispersion compositions upon drying (removal of solvent) coalesce sufficiently to form a self forming film at temperatures less than 50° C. and preferably temperatures less than about 30° C. Most preferred polymer compositions are capable of forming a self supporting film at room ambient temperature (23-25° C.). Characteristically these preferred materials are generally thermoplastic polymers. As used herein "self supporting" means that when the composition is dried down onto a release liner of suitably low surface energy, the film so formed once removed from the release liner is capable of supporting its own weight.

Examples of preferred diisocyanates include tetramethylene diisocyanate, hexamethylenediisocyanate (HDI), dodecamethylenediisocyanate, 1,4-diisocyanatocy-clohexane, 1-isocyanato-3,3,5-trimethyl-5-isocyanatomethylcyclohexane (IPDI), 4,4'-diisocyanato-dicyclohexylmethane (H12 MDI), 4,4'-diisocyanato-2,2-dicyclohexyl-propane, 1,4-diisocyanatobenzene, 2,4-diisocyanatotoluene (TDI), 2,6-diisocyanatotoluene, 4,4'-diisocyanatodiphenylmethane (MDI), m- and p-xylylenediisocyanate, α,α,α'-,α'-tetramethyl-m- and p-xylylenediisocyanate and mixtures of these compounds. Especially preferred diisocyanates include IPDI, H12 MDI, HDI, TDI and MDI. Most preferred diisocyanates include IPDI and H12 MDI.

Suitable polyisocyanates also include triisocyanates such as 1,3,5 triisocyanatocyclohexane-s-trione, isocyanurate and biuret derivatives of HDI and H12 MDI as well as polymeric aromatic isocyanates such as PAPI™ materials from Dow Chemical, Midland, Mich.

Suitable polyols for reaction with polyisocyanates to form polyurethane prepolymers are monomeric or polymeric polyactive hydrogen compounds. The preferred polyols are polyfunctional alcohols. Polyols useful for preparing the polyurethane prepolymer of the invention have a molecular weight range of 62 to 10,000, preferably 200 to 5000 and most preferably 400 to 3000.

Monomeric polyols include diols, triols and higher hydric alcohols. Examples of preferred monomeric polyols include ethylene glycol, propylene glycol, diethylene glycol, 1,4-butane diol, 1,6-hexane diol, 2,2-dimethyl-1,3-propanediol, 1,4-cyclohexanediol, 1,4-cyclohexanedimethanol, glycerol, 1,1,1-trimethylol ethane, 1,1,1-trimethylol propane, and the like.

Polymeric polyols include the polyhydroxy polyesters, polyethers, polycarbonates, polyacrylates, polylactones and silicone polycarbinols in the molecular weight range of from 100 to 4,000 known from polyurethane chemistry. Preferably the polyester compounds of this type may be obtained in a known manner by the reaction of polybasic acids, in particular dibasic acids such as adipic acid, phthalic acid, tetrahydrophthalic acid, dimer acids and/or hexahydrophthalic acid with excess quantities of polyhydric alcohols, preferably dihydric alcohols of the type mentioned above, or by the alkoxylation of suitable starter molecules such as water, ammonia or aniline or the polyhydric alcohols mentioned below with alkylene oxides such as ethylene oxide and/or propylene oxide. Exemplary polymeric polyols include polyoxyalkylene polyols such as CARBOWAX polyglycols available from Union Carbide, Corp., poly(oxytetramethylene) diols such as POLYMEG polyols available from Quaker Oats Company, polyester polyols such as MULTRON polyoxyethylene adipates available from Bayer, Corp., polycarbonate diols from Stahl, Mass., USA and polycaprolactone polyols such as PCP polyols from Union Carbide, Corp. A particularly preferred polyester polyol for use the present invention is the STEPANPOL PH-56 from the Stepan Company. Particularly preferred polyethers are poly(oxytetramethylene) glycols sold under the trade name TERATHANE from E.I. du Pont, Corp.

In order to provide resistance to hydrolysis polyols should be selected that are hydrolytically stable such as polyether and polysiloxane polyols as well as polyols based on polyolefin backbones. Polyester polyols may be employed that are hydrolytically resistant such as those based on hydrophobic subunits (Priplast polyols from Unichema), those based on isophalic acid, as well as polycaprolactone polyols. Other polyols are hydrogenated polybutadiene polyols, fluorinated polyether diols, silicone diols.

Polyols can have a vinylic functionality. A reaction of a vinylic polyol and a polyisocyanate results in a polyurethane polymer having pendant vinylic functional groups. One skilled in the art understands that vinylic functional groups include a variety of chemical structures including allylic, acrylic, styrenic and the like. Polyol esters and amides from glycerol, triaminoethyl amine, triethanol amine, of alpha, beta-unsaturated carboxylic acids such as acrylic acid, itaconic acid, aconitic acid, cinnamic acid, crotonic acid, mesaconic acid, maleic acid, fumaric acid and the like are contemplated by the claimed invention. Further methacrylic esters and methacrylamides are likewise considered to be contemplated by the claimed invention. The vinylic groups are capable of an addition polymerization in subsequent reaction steps, as will be described below. Preferred polyols having a vinylic functionality include glycerol monoallyl ether, N,N dimethylol-1 butene, 4(N,N-dihydroxyalkylaminomethyl) styrene and acrylic compounds of the general formula:

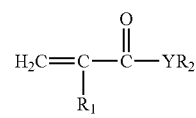

wherein:
Y is O or NH;
$R_1$ is H or $CH_3$;

$R_2$ is —$CH_2CH_2N(CH_2CH_2X)$,

—$(CH_2CH(OR_3)CH_2O)_n$—$CH_2CH(OR_3)CH_2OR_3$;

in which X is OH, $NH_2$ or alkoxylated derivatives of OH or $NH_2$, each $R_3$ is independently —$C(O))_LR_4$ or H where $R_4$ is $C_{1-18}$ alkyl and wherein at least two $R_3$ groups are H and L=0 or 1, and n is 0-10;

and mixtures thereof. The 4 (N,N-dihydroxyalkylaminomethyl) styrene preferably is selected from the group consisting of 4 (N,N-dihydroxyethylaminomethyl) styrene, 4 (N,N-dihydroxypropylaminomethyl) styrene and mixtures thereof. Acrylic polyols include dihydroxypropyl methacrylate, polyglycerol methacrylate, 2,2-dimethylolpropyl methacrylate, N,N-dihydroxyethylaminoethyl methacrylamide, N,N-dihydroxyethylaminoethyl methacrylate, 1,2-dihydroxypropylacrylate, and 1,2-dihydroxypropyl methacrylate. It is understood that although these examples recite methacrylic compounds, they contemplate the corresponding acrylic compounds and compounds of the alpha, beta-unsaturated carboxylic acids recited above.

Vinylic functional monols are also suitable for introducing vinylic functionality to a polyurethane polymer; A vinylic monol adds to isocyanate groups of a growing polyurethane chain end capping or chain terminating the chain. However, monols (vinylic monols and/or antimicrobial quaternary ammonium functional monols) are added at a relatively low level such that the average functionality of the polyurethane is not reduced to less than 1.4, preferably not less than 1.5, more preferably not less than 1.6 and most preferably not less than 1.65 where the average functionality is determined by the following equation:

[Moles A×($F_A$)+Moles B×($F_B$)+Moles C×($F_c$) . . . Moles N($F_N$)]/total moles Where F=functionality after reaction (e.g. for a monol F=1, diol F=2, diisocyanate F=2 etc.)

For example, if 1 mole of a difunctional isocyanate terminated prepolymer is reacted with 0.25 mole of monol after the reaction there will be (1−0.25) or 0.75 moles of diisocyanate functional prepolymer and 0.25 moles of monoisocyanate functional prepolymer. The average functionality after reaction would be:

[0.75*(2)+0.25*(1)]/1=1.75

In this manner, the polyurethane after chain extension has sufficient molecular weight to have good physical properties. When difunctional isocyanates and diols are used along with difunctional chain extenders the amount of monol is conveniently expressed as the ratio of active hydrogen on the monol to isocyanate on the isocyanate functional prepolymer (without chain extension). In this case, the amount of monol is less than 40 mole %, preferably less than 25 mole % and most preferably less than 20 mole % of the isocyanate present. In order to ensure sufficient vinylic groups for attachment of antimicrobial quaternary ammonium groups, however, the amount of vinyl monol is preferably greater than 2.5 mole % more, preferably greater than 5 mole % and most preferably greater than about 10 mole %.

The amount of monols is limited to ensure sufficient molecular weight of the chain extended polymer. The preferred weight average molecular weight is at least about 15,000, preferably at least 25,000 and more preferably at least 50,000 and most preferably at least 100,000 daltons. Higher molecular weight polymers generally form films which are tougher, have higher tensile strength and are more abrasion resistant. In certain embodiments where these properties are not necessary, such as water soluble antimicrobials, lower molecular weight may be preferred to facilitate diffusion.

Representative vinylic monols include monohydroxyalkyl (meth)acrylate esters, monohydroxyalkyl (meth)acrylamides, allyl alcohol and allyl amine. Preferred vinylic monols are hydroxyalkyl acrylic compounds of the formula:

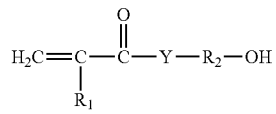

wherein:
Y is O or NH;
$R_1$ is H or $CH_3$;
$R_2$ is a $C_{2-8}$ alkylene;
or mixtures thereof.

Monohydroxyalkylacrylate esters include esters from glycols such as ethylene glycol, di-, tri-, tetra- and (poly)ethylene glycols, propylene glycol, dipropylene glycol, 1,3- or 1,4 butylene glycol, 1,6-hexamethylene glycol and the like. Monohydroxyalkyl acrylamides include amides from alkanol amines such as ethanol amine, 1,2- and 1,3-propanol amine, 6-aminohexanol and the like.

The inventors contemplate that vinyl functionality may also be added to the polyurethane through the use of an isocyanate functional vinylic group. For example, isocyanatoethyl methacrylate could be used. Alternatively, hydroxyethylacrylate could be reacted with isophorone diisocyanate at an NCO/OH ratio of 1 to produce an isocyanato functional acylate. These compounds could be further reacted into the polyurethane by conventional means. Similarly polyisocyante functional vinyl groups could be incorporated in a similar manner. One skilled in the art will recognize that many isocyanate functional vinyl compounds are possible.

Important additional components include compounds to aid water dispersibility and stability of the dispersion of the fully formed polyurethane polymer. Dispersing aids may have cationic, anionic, or nonionic groups as well as combinations thereof which aid in dispersibility and/or dispersion stability. Preferred dispersing group containing compounds are water soluble at 20%, preferably 30% and most preferably at 40% by weight in water determined by simple mixing of the compounds with water. For dispersing group containing compounds that are solids at room temperature, the water/compound mixture should be heated to over the melting point of the compound and allowed to cool. For ionic groups, solubility of the dispersing group containing compounds is measured in the ionized form.

Components providing cationic dispersing groups include hydroxy-functional and/or amino-functional compounds, which can be monofunctional and especially polyfunctional polyactive hydrogen compounds in the molecular weight range of 88 to about 2000, preferably 90 to about 1500, and more preferably 100-1000, and which contain tertiary amine nitrogen or quaternary amine nitrogen atoms to aid with the aqueous dispersibility of the fully formed polyurethane polymer. The tertiary amine nitrogen atoms in the cationic stabilizing group preferably are converted at least partly into cationic quaternary ammonium groups by neutralization with an inorganic acid such as hydrochloric acid, hydrobromic, phosphoric, sulfuric and the like or an organic acid such as a $C_{1-4}$ alkylcarboxylic acid, $C_{1-4}$ alkylsulfonic acid, or quaternization by an alkyl halide such as methyl chloride and the like or a dialkyl sulfate such as dimethyl sulfate and the like during or after termination of the isocyanate polyaddition reaction. The concentrations of the cationic group thus obtained, affects the particle size, the viscosity, and the stability of the dispersion. Examples include 2-(N,N-dimethylamino)-ethylamine, N-methyl-diethanolamine, N-methyl-diisopropanolamine, N-ethyl-diethanolamine, N-ethyl-diisopropanolamine, N,N'-bis-(2-hydroxyethyl)-perhydropyrazine, N-methyl-bis-(3-aminopropyl)-amine, N-methyl-bis-(2-aminoethyl)-amine, N,N',N"trimethyl-diethylenetriamine, N,N-dimethyl-aminoethanol, N,N-diethyl-aminoethanol, 1-(N,N-diethylamino)-2-aminoethane and 1-(N,N-diethylamino)-3-aminopropane. Longer alkyl or aralkyl derivatives of these are also listed including surfactant type compounds and polyethoxylated derivatives thereof such as Variquat K1215, (PEG-15 cocomonium chloride), available from Witco Corp. Dublin Ohio. Examples of other suitable alcohol functional quaternary ammonium salts include compounds identified in CTFA Cosmetic Ingredient Handbook $2^{nd}$ Ed. published by The Cosmetic, Toiletry, and Fragrance Association as Quaternium 52 (a polyethoxylated stearltriethanolamine available from Henkel as Dehyquart SP), Quaternium 80 (a polydimethylsiloxane terminated in alkldimethylammoniumhydrodoxypropylpropylether groups available from Goldschmidt Chemical Corp., Hopewell, Va. as Abil Quat 3270, 3272 and 3474), and Quaternium 82 (1,1 dipropyloleate, 2,2 dihydroxypropyl 2methyl ethylenediamine methosulfate). To obtain water dispersibility, the ionic equivalent weight of the prepolymer (gram prepolymer per equivalent of ionic stabilizing cationic group) should be in the range of 250 to 5000, preferably 500 to 3000, and more preferably 600 to 2000. It should be noted that refers only to the cationic groups that aid in dispersibility, i.e. have significant water solubility, and does not include cationic groups derived from the antimicrobial quaternary ammonium groups.

Non-ionic groups such as ether or ester functionality that provides a ratio of 2.5 or less carbon atoms for each oxygen atom to give sufficient water solubility to aid in water dispersibility or water solubility may also be used. Suitable compounds include (i) polyoxyalkylene diols, triols, and tetrols, (ii) polyoxyalkylene diamines and triamines, and (iii) polyester diols, triols, and tetrols of organic polycarboxylic acids and polyhydric alcohols having a molecular weight of 106 to about 15000, preferably 200-6000 and most preferably from 400-2000. Preferred oligomeric polyols and polyamines include (i) polyethylene oxide homopolymers (e.g., CARBOWAX series from Union Carbide, Danbury, Conn., e.g. Carbowax 600 and 1000), block copolymers of ethylene oxide and propylene oxide (e.g., PLURONIC surfactants from BASF Corporation, Mount Olive, N.J.), random copolymers of ethylene oxide and propylene oxide (e.g., UCON FLUIDS from Union Carbide, Danbury, Conn.), and silicone copolyols.

The dispersibility can also be achieved by combinations of the above cationic and non-ionic compounds When the concentrations of solubilizing groups are high the polymer may be soluble in aqueous solution. For certain applications such as preservation of cosmetics, topical antiseptics, hard surface antiseptics, disinfection or articles such as contact lenses and the like water soluble polymers may be preferred. Due to the relatively high molecular weight and low levels of extractables, the polymers of the present invention are expected to have very low toxicity.

Water resistance is an important property for outdoor applications. Thus, for these applications, the polymers are preferably water insoluble. As used herein, water insoluble means that when a dried coating or film (e.g. dried at 75° C. for 2 hours to form a film of about 0.001-0.002 inches thick) is placed in water without stirring for 4 hours at room temperature, removed, and dried at 75° C. for 2 hours less than 10%, preferably less than 5%, more preferably less than 2% and most preferably less than 1% of the weight is lost. In order to reduce water uptake in long term durable outdoor applications the concentration of cationic stabilizing moiety should be kept to a minimum. Polysiloxane polyols may optionally be incorporated into the polyurethane compositions of the invention to improve outdoor weathering as well as adhesion to certain substrates and to vary the surface properties of a coating with respect to surface energy, e.g. contact angle.— For example, siloxanes such as hihydroxy functional polydimethylsiloxane diol, available from Chisso Corporation, Tokyo, Japan as the trade designation FM DA11, FMDa21, FMDA25, having molecular weights from 1000-10,000 are useful Other dihydroxyl functional PDMS diols that can be used are KF6002, KF6003 available from Shin-Etsu silicone of America Inc, PDMS idol having molecular weight of 1000-3000 from Dow Corning Corporation.

A person skilled in polyurethane art understands that the physical and chemical properties of the biocidal polymer can be varied by the choice of polyisocyanate and polyol and their relative amounts. This enables the skilled practitioner to vary the properties of the biocidal polyurethane polymers to optimize performance of the polymer on different substrates and in different use environments. Included among the properties that can be varied are ductility, water absorption, tensile strength, modulus, abrasion resistance, minimum film formation temperature, glass transition temperature, ultraviolet light resistance, resistance to hydrolysis and color stability. For example, polyols having longer carbon chain length tend to provide materials which are more ductile and have lower glass transition temperatures, whereas shorter chain polyols provide materials that tend to have high modulus, greater tensile strength and higher glass transition temperatures. Aliphatic polyols tend to provide polymers which absorb less water than comparable polymers from polyols having heteroatoms. For outdoor applications where stability to ultraviolet light is important, aliphatic isocyanates and polyols are preferred.

In accordance with the invention, there may be further employed amine catalysts to accelerate the reaction between isocyanate and the active hydrogen compound which are known to the art, such as, for example, tertiary amines such as triethylamine, tributylamine, N-methylmorpholine, N-ethylmorpholine, N-cocomorpholine, N,N,N',N'-tetramethylethylenediamine, 1,4-diazabicyclo-(2,2,2)-octane N-methyl-N'-dimethylaminoethylpiperazine, N,N-dimethyl-benzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-betaphenylethylamine, 1,2-dimethylimidazol, 2-methylimidazol and the like.

Metal compounds and, in particular, organic tin compounds can also be used as catalysts. Suitable organic tin compounds, include tin (II) salts of carboxylic acids, such as tin(II)-acetate, tin(II)-octoate, tin(II)-ethylhexoate and tin (II)-laurate and the dialkyl tin salts of carboxylic acids such as dibutyltin diacetate, dibutyl-tin diluaurate, dibutyl-tin maleate, diocytl-tin diacetate as well as tin compounds which have active hydrogens and are capable of reacting into the polyurethane backbone such as Fastcat 4224 available from Elf Atochem, Philadelphia, Pa. For outdoor applications and other applications where discoloration due to oxidation can occur the tin catalysts are preferred.

Once the prepolymer is formed, the molecular weight should be increased to yield a composition with the desired properties. This step is accomplished by reacting the prepolymer with a chain extender. Useful polyamine chain extenders include: ethylenediamine; 1,6-diaminohexane; piperazine; tris(2-aminoethyl)amine; and amine terminated polyethers such as those marketed as JEFFAMINE by the Huntsman Corporation, Salt Lake City, Utah, for example JEFFAMINE D230 and JEFFAMINE D400. Useful carboxylic acid hydrazide chain extenders include adipic acid dihydrazide and oxalic acid dihydrazides. Examples of polyhydroxyl compounds useful as chain lengthening agents include ethylene glycol, propylene glycol, propane-1,3-diol, butane-1,4-diol, hexane-1,6-diol, trimethylolpropane and glycerol. Low molecular weight polyester diols such as the bis-(hydroxyethyl)ester or adipic acid or low molecular weight diols containing ether groups such as diethylene glycol, triethylene glycol, tetraethylene glycol, dipropylene glycol, tripropylene glycol or tetrapropylene glycol may also be used as starting component. Useful polythiol chain extenders include 1,2-ethanedithiol; 1,4-butanedithiol; 2,2'-oxytris(ethane thiol) and di- and tri-mercaptopropionate esters of poly(oxyethylene) diols and triols. Water is also useful as a chain extender as it reacts with isocyanate to form an unstable carbamic acid, which loses carbon dioxide to liberate an amine. This amine is then available to react with another isocyanate.

When the prepolymer has a functionality of 2 or less and the chain extender is difunctional, the ratio of isocyanate to active hydrogen in the chain extension step is preferably from about 0.6-1.2 to 1, more preferably from 0.75-1.0 to 1 and most preferably from 0.80-1.0 to 1 (except when water is used as the sole chain extender, in which case water can be present in large molar excess). When the prepolymer has a functionality higher than 2, due to the use of polyols or polyisocyanates with a functionality greater than 2, the ratio of isocyanate to active hydrogen present in the chain extender should be proportionately adjusted downward to prevent gelation and/or excessive crosslinking.

The chain extender may be added to the polyurethane prepolymer before the dispersion step or it may be added to the aqueous dispersion medium. Most preferred chain lengthening or chain extending compounds added during the dispersion step are those containing reactive —NH or —NH$_2$ groups useful as chain lengthening agents include C$_{2-8}$ alkylenediamines such as preferably ethylenediamine, pentane diamine, hexamethylenediamine and polyoxyalkylene amines such as JEFFAMINES available commercially from Huntsman Corp., hexamethylenediamine, piperazine, 2,5-dimethylpiperazine, 1-amino-3-aminomethyl-3,5,5-trimethyl-cyclohexane (isophorone diamine (IPDA), 4,4'-diamino-dicyclohexylmethane, 1,4-diaminocyclohexane, 1,2-diamino-propane, hydrazine, hydrazine hydrate, amino-acid hydrazides such as 2-aminoacetic acid hydrazide.

Dicarboxylic acid dihydrazides have been found to be particularly useful chain lengthening agents. Preferred dihydrazides include oxalic acid dihydrazide, malonic acid dihydrazide, succinic acid dihydrazide, glutaric acid dihydrazide, adipic acid dihydrazide, sebacic acid dihydrazide, maleic acid dihydrazide, and fumaric acid dihydrazide.

The amine and hydrazide chain lengthening agents in particular, which contain no tertiary nitrogen atoms, may also be used in blocked form in the process according to the invention, i.e. in the form of the corresponding ketimines (DE-AS 2,725,589), ketazines (DE-OS 2,811,148, U.S. Pat. No. 4,269,748) or amine salts (U.S. Pat. No. 4,292,226). Oxazolidines of the type used, for example, in DE-OS 2,732,131 or U.S. Pat. No. 4,192,937 are also masked diamines which may be used for chain lengthening the isocyanate prepolymers. When such masked diamines are used, they are generally mixed with the isocyanate prepolymers in the absence of water and the mixture obtained is subsequently mixed with the water of dispersion or with part of the water of dispersion so that the corresponding diamines are released as intermediate products by hydrolysis.

Biocidal Agent

Biocidal properties capable of killing bacteria, mold, mildew, fungi, algae and the like or inhibiting their propagation are achieved by incorporating one or more covalently bound quaternary ammonium groups pendant to the polyurethane polymers of the claimed invention. Preferred antimicrobial quaternary ammonium groups include the following structures:

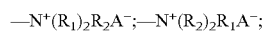

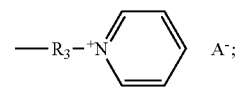

or

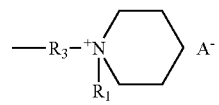

Where each R$_1$ is independently C$_{1-4}$ alkyl optionally substituted in or on the chain by N, O, and S (e.g. hydroxyethyl), benzyl, C$_{1-4}$ substituted benzyl, and Ph—O—CH$_2$CH$_2$— where Ph=phenyl; R$_2$ is C$_{8-26}$ straight or branched chain alkyl or C$_{8-30}$ aralkyl optionally substituted in or on the chain by N, O and S and may include groups such as esters, ethers, amides, hydroxyl and the like; and R$_3$ is a linkage group which is C$_{8-26}$, preferably C$_{10-22}$ alkyl optionally substituted in or on the chain by N, O and S and may include groups such as esters, ethers, amides, hydroxyl and the like; and A is an anionic counter ion and is selected from halogen, alkyl sulfate, carboxylate, sulfonate, sulfate, phosphonate or phosphate but is preferably Cl$^-$, Br$^-$, CH$_3$(CH$_2$)$_p$COO$^-$, or CH$_3$(CH$_2$)$_p$OSO$_3^-$ where p=0-6

It is understood that a mixture of antimicrobial groups from within one class having different chain length alkyl groups may be employed as well as mixtures of antimicrobial groups from two or more classes.

The quaternary ammonium group can be part of a monol or a polyol compound capable of reaction with excess isocyanate from a polyurethane prepolymer or may be part of a vinylic functional compound capable of reacting onto vinylic groups present on the polyurethane polymer. For example, suitable materials contemplated by the claimed invention include stearamidopropyl-3-(2-hydroxyethyldimethyl) ammonium bromide which can be made by the reaction of an alpha, omega haloalcohol such as 2-bromoethanol and stearamidopropyl-3-dimethyl amine. The alkyl portion of the haloalcohol may have from two to sixteen carbon atoms or more, preferably two to twelve carbon atoms. Representative haloalcohols include 4-bromobutanol, 6 bromohexanol, 8 bromooctanol, 10-bromodecanol and 12-bromododecanol. It is understood that the halo atom can also be chlorine or iodine or may be substituted with other suitable anions. The reaction product of the stearamidoproyl monol and a isocyanate terminated prepolymer provides a biocidal quaternary ammonium group at the end of a polyurethane chain.

Representative preferred monols having biocidal quaternary ammonium activity are selected from quaternary ammonium moiety of the formula:

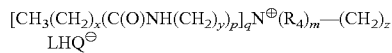

wherein:

m is 1 or 2; p is 0 or 1 and q=1 or 2 provided that m+q=3; x is 6 to 20; y is 2-8, z is 2-10; L is O, S, $NR_5$ or NH; where $R_5$ is $C_{1-4}$ alkyl or benzyl each $R_4$ is independently $C_{1-4}$ alkyl or $C_{6-18}$ aralkyl; and $Q^\ominus$ is halogen, alkyl sulfate, carboxylate, sulfonate, sulfate, phosphonate or phosphate but is preferably Cl$^-$, Br$^-$, $CH_3(CH_2)_zCOO^-$, or $CH_3(CH_2)_zOSO_3^-$ where z=0–6; Other non-limiting examples of monols having a biocidal quaternary ammonium functionality includes $C_{8-18}$ alkyl di-$C_{1-4}$ alkylhydroxyethyl ammonium halide, $C_{8-18}$ dialkyl $C_{1-4}$ alkylhydroxyethyl ammonium halide, $C_{8-18}$ alkyl $C_{1-4}$ alkyl benzylhydroxyethyl ammonium halide such as lauryldimethylhydroxyethyl ammonium chloride, didecylmethylhydroxyethyl ammonium chloride, laurylbenzylmethylhydroxyethyl ammonium chloride and the like.

A monol having quaternary ammonium functionality can be incorporated into the interior of the polyurethane chain by several methods. For example, adding the monol to one of the isocyanate groups of a triisocyanate such as 1,3,5-triisocyanatocyclohexane-s-trione. The resulting product has two free isocyanate groups capable of forming a polyurethane with a polyol.

As previously discussed the amount of monol must be limited to ensure that the functionality of the prepolymer before chain extension is not less than 1.4, preferably not less than 1.6 and most preferably not less than 1.65. The amount of biocidal quaternary ammonium groups present in the polymer, however, must be sufficient to provide a biocidal polymer. We have found that the equivalent weight of the antimicrobial quaternary ammonium groups should be at most about 22000 g polymer/equivalent, preferably at most 20,000 g polymer/equivalent and most preferably at most about 18,000 g polymer/equivalent biocidal quaternary ammonium group. Conversely, the amount of biocidal quaternary ammonium group in certain applications such as those requiring water resistance is preferably limited and thus the equivalent weight of the antimicrobial quaternary ammonium groups should be at least 1000 g polymer/equivalent, preferably at least 2,000 g polymer/equivalent, more preferably at least 4000 g polymer/equivalent quaternary antimicrobial group. It is noted that this is the total amount of biocidal quaternary ammonium group present in the polymer and may be derived from monol antimicrobial quaternary ammonium containing compounds, vinylic antimicrobial quaternary ammonium containing compounds, or both.

The quaternary ammonium group can be part of a vinylic monomer which can be polymerized by addition polymerization with a polyurethane prepolymer having vinylic functionality. Preferred vinylic functional biocidal quaternary ammonium compounds have the formula:

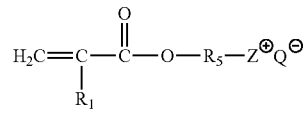

wherein:

$R_1$ is H or $CH_3$;

$R_5$ is a $C_{2-18}$ alkylnene and preferably $C_{2-10}$ alkylene;

$Q^\ominus$ is a halogen, alkyl sulfate, alkylsulfonate or alkylcarboxylate;

$Z^\oplus$ is —$N^\oplus(R_4)_2R_3$, —$N^\oplus R_4(R_3)_2$,

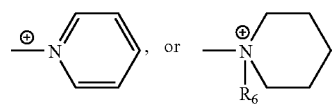

wherein:

$R_3$ is $C_{8-20}$ alkyl, benzyl, or substituted benzyl;

$R_6$ is H or $C_4$ alkyl;

Representative acrylic compounds are N,N-dimethyl-N-alkyl-N-alkylmethacroyl ammonium salt such as N,N-dimethyl-N-dodecyl-N-ethylmethacroyl chloride, N,N-dimethyl-N-hexadecyl-N-ethylmethacroyl chloride, N,N-dimethyl-N-benzyl-N-lauroylmethacoryl chloride, N,N-dimethyl-N-(2,4-dichlorobenzyl)-N-ethylmethacroyl chloride, N,N-diethyl-N-hexadecyl-N-ethylmethacroyl chloride, and the like. It is understood that the counter ion can be a chloride, bromide, iodide, C1-4 alkyl sulfate, sulfate, or carboxylate group. It is also understood that although representative quaternary ammonium groups are described that any combination of alkyl, aromatic, alkyl aromatic or cycloalkyl groups attached to the ammonium nitrogen which provide a biocidally active structure are within the contemplated scope of the claims.

It is understood that a wide variety of vinyl comonomers not comprising antimicrobial quaternary ammonium groups may be used. Non-limiting examples include: acrylates, methacrylates, (meth)acrylamides, N-vinyl caprolactams, styrene, olefins, vinyl acetate, and the like.

Other compounds may be added to enhance or obtain particular properties, provided they do not interfere with the coating, and film forming properties. The compositions may contain defoaming agents, particularly useful defoaming agents such as Surfynol™ DF 110L (a high molecular weight acetylenic glycol nonionic surfactant available from Air Products & Chemicals, Inc.), SWS-211 (a silicone additive available from Wacker Silicone Corp), Dehydran™ 1620 (a modified polyol/polysiloxane adduct available from Henkel Corp.), Additive 65 (a silicone additive available from Dow corning) can be used; the dispersion may also contain flow and leveling agents such as Igepal™ CO-630 (an ethoxylated nonylphenol nonionic surfactant available from Rhone-Poulenc Surfactant & Speciality Div.), Fluorad FC-171 (a nonionic surfactant available from 3M Company), Fluorad FC-430 (a nonionic surfactant available from 3M Company), and Rexol™ 25/9 (an alkyl phenol ethoxylate nonionic surfactant available from Hart Chemical Ltd.). Optionally the dispersion may contain rheology modifiers such as the associative thickeners Acrysol™ RM-825, Acrysol TT-935 all available from Rohm and Haas company. Additional soluble or dispersed polymers not having antimicrobial quaternary ammonium groups may also be used to modify the film properties including but not limited to polyurethanes; polyacrylates and other addition polymers; natural polymers such as starch, cellulose, and other gums and derivatives thereof, as well as combinations thereof. To increase the service life of the coatings generated from these dispersions, photostabilizers such as Tinuvin™-400, (a hindered amine photostabilizer), Tinuvin™ 292 (a hindered amine photostabilizer), both commercially available from Ciba-Geigy Ltd.; and antioxidant Irganox 245 available from Ciba-Geigy Ltd., and Naugard-445, a 4,4'-bis (dimethylbenzyl) diphenylamine, available from Uniroyl Chemicals can be added. For out door applications such as roofing shingles which are often subject to intense UV exposure, at least about 0.1 part by weight of an ultraviolet light stabilizer per 100 parts by weight polyurethane dispersion can be used to inhibit and retard the yellowing and photo degradation of such formulations, typically about 0.1 to about 10 parts, preferably about 1 to about 10 parts.

It may also be desirable in certain compositions to add a colorant (dye or pigment). For more durable applications it may be beneficial to add colorants that can react into the polyurethane or acylate backbones. For example, certain Reactant dyes available from Milliken Chemical, Spartanburg, S.C., have hydroxyl groups that can be incorporated into the polyurethane backbone to produce a polymer bound chromophore. Similarly, surface treated functionalize pigments may also be useful.

Polymerization Reactions

Processes for forming polyurethane polymers are well known and disclosed in numerous treatises such as *Szycher's Handbook of Polyurethanes*, CRC Press, 1999. Polymers may be formed in one step or two steps involving a "prepolymer" intermediate. Although a one step process can yield biocidal polyurethane polymers contemplated by the invention, the two step process is preferred. The prepolymer is formed from at least one poly-active hydrogen compound such as a polyol or polyamine terminated monomer with at least one polyisocyanate wherein at least 40, preferably 60 and most preferably 80 mole % excess of a polyisocyanate with respect to active hydrogen groups are present. The reaction of diisocyanates and diol or diamine polyols tends to form linear polymers. Depending on the particular combination of isocyanate and active hydrogen compound, the reaction may proceed at temperatures less than 100° C. However, the rate of polymerization may be accelerated by catalysts such as those described above. For example, catalysts may be required if aliphatic diisocyanates are used especially in combination with polyfunctional alcohols. Monomers providing additional functional benefits may be incorporated into the prepolymer or added in the second stage of the polymerization. For example, polysiloxane diol may be added at either stage of polymerization to effect improved adhesion to certain substrates as well as improved hydrolytic resistance and UV stability. Likewise, dihydroxyethylmethylamine may be incorporated into the polymer at any stage of polyurethane formation and eventually transformed to a quaternary salt to improve the stability and dispersibility in water.

The reaction of the isocyanate and polyol to form the prepolymer will depend on the choice of both. Aromatic isocyanates are generally much more reactive than aliphatic isocyanates and may be reacted with polyols without the need for heat. The reaction may be run as 100% solids (no solvent) or is carried out in an optionally polar organic solvent unreactive with an isocyanate such as acetone, methyl ethyl ketone (MEK), methoxypropanol acetate (PM acetate), dimethyl acetamide tetrahydrofuran, N-methyl-pyrrolidinone and mixtures thereof. When using preferred aliphatic isocyanates with polyfunctional alcohols high solids concentrations and elevated reaction temperatures of from 50° C. to 80° C. are desirable so that high conversions of monomers to polymer can occur in a reasonable time, e.g., less than eight hours, preferably less than three hours. Catalysts may be employed such as metal salts including dibutyltin dilaurate and dibutyltin diacetate, and amines, such as triethylamine, DBU (1,8-diazabicyclo 5.4.0 undec-7-ene) and DABCO (1,4-diazabicyclo 2.2.2octane), in useful concentrations of from 0.01 to 1.0 mole percent (relative to the isocyanate reagent).

As described above vinylic functionality may be introduced during prepolymer formation by incorporating vinylic monol or polyol compounds into the prepolymer. The vinylic functionality of the prepolymer is subsequently polymerized by addition polymerization with a vinylic quaternary ammonium compound such as N,N-dimethyl-N-hexadecyl-N-methylmethacroylethyl ammonium chloride.

Polymerization of vinylic groups is performed under an inert atmosphere such as nitrogen and in the presence of a free radical catalyst such as azobisisobutyronitrile. The polyurethane prepolymer having pendant quaternary ammonium salts is dispersed in the aqueous solution. This is carried out in the laboratory by adding the prepolymer at a controlled rate to the de-ionized water, and homogenizing using a stainless steel Rotor Stator (20 mm diameter probe) mounted to a Omni Mixer (obtained from Omni International) at around 6000 rpm. The homogenization is carried out for at least 5 minutes after complete addition of the polymer. Then the chain extending "polyol" is added and mixed for another minute. The dispersion is transferred to a Microfluidics homogenizer (obtained from Microfludics International corporation, MA, USA) having a reaction chamber type E-2302 and pressure of around 400 psi and homogenized for another 5 minutes. The resulting dispersion is further mixed for at least 1 hour and preferably 4 hours.

The dispersions of the present invention are considered stable when there is no coagulation of polymers, or complete separation of the solid polymer from the aqueous phase at room temperature, over a period of at least 4 weeks, preferably 8 weeks, more preferably 26 weeks and most preferably at least 52 weeks at 23-25° C. Even if the polymer solid settles, the settling can be re-dispersed by simple shaking or by mechanical mixing. The stability of the dispersions depends on the number of ionic sites contained in the macromolecules. The particle size of the dispersion is partly dependent on the homogenization techniques, as such, poor homogenization may generate larger particles, which may settle. Preferred dispersions of the present inventions are stable for at least 3 months at room temperature or the dispersions can re-dispersed by simple shaking or by mechanical mixing. These shaken dispersions when filtered through cheese cloth leave no residue.

Coatings produced from compositions of the present invention are suitable for any surface subject to deterioration or discoloration from microorganisms such as algae, mold, fungi, or bacteria. For example, construction materials such as roofing felts or lumber may discolor or decay over time if used in a moist environment. Other substrates include roofing shingles, roofing granules, tile, concrete, metal, polymers, cloth, fibers, and wood. The coatings may also be applied to inanimate surfaces in health care facilities to mitigate the spread of pathogenic organisms. Surfaces include hard surfaces such as walls, floors, furniture, food trays and "soft"

surfaces such as bedding, uniforms and linen supplies. The coatings may also be applied to wound dressings on or in an absorbent pad, catheters and other indwelling devices, medical drapes, surgical sponges, diapers and the like to prevent microbial growth.

In a similar vein, interior surfaces of meat and food processing plants or food service operations may be coated with the polyurethane polymers having pendant quaternary ammonium groups of the invention to reduce spoilage, extend shelf life and to mitigate the transmission of microorganisms capable of causing food-borne illness. Since the antimicrobially effective quaternary ammonium group is not leached from the coating, such coatings could be considered for cosmetic and medical packing as well as food contact surfaces such as food preparation surfaces and food packaging materials such as over-wraps for meat, dairy and produce, trays and absorbent pads for packaging meats and produce, and the like.

Polyurethane polymers of the present invention may also find use in cosmetic and personal care compositions which are applied to living tissue such as lipstick nail lacquers, skin fungus treatments, hand wash products, foams used to apply cosmetics as well as other foams such as household sponges, lipsticks, mascara, hair fixatives, antimicrobial polymeric thickeners, use as binders and finishes on textiles, in caulking compounds and the like. Solutions of polymers of the present invention may also find use as non-irritating, non-sensitizing disinfectants for objects such as contact lens which are intended to come into contact with sensitive tissue or as preservatives in cosmetic formulations such as mascara, creams, lotions, shampoo, soaps and the like.

EXAMPLES

The invention herein is subject to many variations and the examples which follow are but illustrative of the many embodiments of the invention which is not to be limited thereto.

Glossary of Exemplary Materials:

DMPA—dimethylolpropanoic acid.

PDMS—Polydimethyl siloxane diol, equivalent weight 1278, available from Dow Corning, Midland, Mich.

TERATHANE 2000—polybutylene (1, 4) glycols, mol. wt. 2000, available from DuPont, Canada, Missauga, Ontario.

NMP-N-Methyl-2-pyrrolidone obtained from BASF Mount Olive, N.J.

MEK—Methyl Ethyl Ketone

DESMODUR W—(bis(4-isocyanatocyclohexyl)methane available from Bayer Corporation, Pittsburgh, Pa.

EDA—Ethylene diamine.

TONE 0230—a polycaprolactone based diol of molecular weight of 830 available from Union Carbide, Danbury, Conn.

TEGO-HSI-2311—polydimethyl siloxane diol, molecular weight 2500, available from Goldschmidt Corporation, McDonald, Pa.

N-MDEA—N-Methyldiethanolamine.

HEA—Hydroxyethyl acrylate

DMAEMA-Cx—dimethyl alkyl methacryloyloxyethyl ammonium (bromide or chloride) wherein Cx refers to alkyl chain length, e.g. $C_{16}$ is hexadecyl.

VAZO-52—2,2'-azobis(2,4-dimethylpentanenitrile), obtained from DuPont.

AADH—adiptic acid dihydrazide.

PRIPPLAST 3192—a dimer acid based polyester polyol, approx. molecular weight 2000, obtained from Unichema International, Chicago, Ill.

PROPOL 2033—a dimer diol, approx. molecular weight of 600, obtained from Unichema International.

STEPANOL PH-56—a polyester based polyol, approx. molecular weight 2000, available from Stepan company, Northfield, Ill.

INCROMINE SB—Stearamidopropyl Dimethylamine, melting point approx. 65° C., available from Croda Canada Chemicals, Toronto, Canada.

N-Methyl pyrrolidone (NMP).

$X_p$-7100—trifunctional isocyanate from Bayer Corp., Pittsburgh, Pa.

PRIPLAST 3197—dimerdiol dimerate from Unichema International.

T-12—dibutyl tin dilaurate from Air Products, Wayne, Pa.

Tone 0210—a polycaprolactone based idol, molecular weight 830, available from Union Carbide.

IEMA—isocyanato ethyl Methacrylate, obtained from Showa Denkok. K., specialty chemicals, Japan.

T-120: a tetravalent tin catalyst, obtained from Air Products

A-1170: bis-(gamma-trimethoxysilylpropyl)amine, obtained from Union Carbide

Fastcat 4224; a active hydrogen functional tin catalyst obtained from Elf Atochem North America, Philadelphia, Pa.

Example 1

Preparation of Quaternary Ammonium Salt of DMAEMA

A reaction flask was fitted with a condenser, a mechanical stirrer, a thermometer and addition funnel. To the flask 25 parts of DMAEMA (dimethylaminoethyl methacrylate) and 60 parts of acetone was added. To this mixture was added 48.7 parts of 1-bromohexadecane from the dropping funnel in 30 minutes. The mixture was stirred at 35° C. for 16 hours. Then the reaction mixture was allowed to cool to room temperature and a white solid precipitated out of the solution. The precipitated solid was filtered and washed with cold ethylacetate. The solid was dried in the vacuum oven at 30° C. for 4 hours. A $^1$H NMR spectrum of the compound revealed the formulation of the desired compound DMAEMA-$C_{16}$ monomer.

Preparation of Polyurethane Having an Antimicrobial Quaternary Ammonium Salt:

A dispersion was prepared in three sequential steps: 1) an isocyanate terminated prepolymer was prepared at 80° C., in a resin reactor, equipped with a reflux condenser, stirrer, thermometer and inlet nitrogen gas by reacting, 12.7 g of DESMODUR-W, 10 g TEGO-HSI-2311, 3 g of N-methylpyrrolidone (obtained from BASF) 3 g of methylethylketone and 1 drop of T-12 for 1.5 hours. Then 7.5 g of Terathane, a poly(tetramethylene) glycol based polyether of molecular weight 2000, available from Du-pont), 0.46 g of PRIPOL 2033, a dimer diol, m.wt 400 and 16.6 g PRIPLAST 3192 m.wt of 2000 were reacted for another 2 hours, then 2.04 g of N-methyl diethanolamine with 10 g of acetone was added and reacted for 1 hr 15 min.

2) To this fully reacted prepolymer 0.5 g of hydroxyethyl acrylate along with 0.001 g of hydroquinone, available from Aldrich of Milwaukee, Wis. was added and reacted for 1 hr 45 min until the desired % NCO was obtained.

3) Next nitrogen was bubbled through the partly acrylate-terminated prepolymer for 1 hr, and temperature was reduced to 65° C. 6 g DMAEMA-C16 was mixed with 10 g NMP/30 g MEK and 0.12 g of VAZO-52 and added to the prepolymer mixture. This was reacted for 3 hours. 40 g of Acetone was added to reduce the viscosity during the preparation.

The cooled composition was dispersed in 90 g of water containing 1.2 g of acetic acid using an "Omni Macro homogenizer" (available from Omni International, Va., U.S.A) for 10 minutes then 2.0 g of adipic acid dihydrazide was added and mixed for 8 hours at 40° C. A milky white dispersion was obtained having 25% solids and an average particle size of 271 nm. (Determined using a Brookhaven "Zeta potential Analyzer" from Brookhaven Instruments Corporation, Holtsville, N.Y.). The polymer had a cationic stabilizing group equivalent weight of 1362 g polymer/equivalent and an antimicroibal quaternary ammonium group equivalent weight of 3860 g polymer/equivalent.

Example 2

Comparative Example

A prepolymer was prepared without DMAEMA-C$_{16}$, with the similar technique as in example 1, with 12.19 g TEGO-HSI 2311, 16.23 g DESMODUR W, 10 g g N-methylpyrrolidone, 0.01 g of T-12, 7.87 g TERATHANE-2000, 0.5 g PRIPOL-2033, 16.22 g PRIPLAST 3192, 3.0 g of N-methyl diethanol amine and 0.5 g of hydroxy ethyl acrylate.

The resulting prepolymer was dispersed in 90 g of water containing 1.2 g of acetic acid. Then 2.9 g of adipic acid dihydrazide dissolved in 40 g hot water was added and mixed for 8 hours at 40° C. A milky white dispersion was obtained.

Example 3

This example illustrates polyurethane prepared from alkylamidoalkyldimethylamines and halo alkanolamine The hydroxy quat of alkylamidopropyldimethylamine was prepared by adding 37.34 g of stearamidopropyl dimethylamine (INCROMINE SB) which was washed with warm water, acetone and then dried in vacuum) in 40 g toluene and heated at 105° C. in flask equipped with mechanical stirrer, reflux condenser and a dropping funnel. To this 12.66 g of 2-Bromoethanol was added drop-wise and reacted for at least 2 hours. After cooling, the salt was filtered through a Buchner funnel and washed with toluene. The salt was then dried at 35° C. for 16 hours. A prepolymer was prepared by reacting 1.2 g 1,6 hexane idol, 36 g PRIPLAST 3196, 20 g STEPANOL PH-56, 36 g DESMODUR-W, 10 g N-methyl pyrrolidone, 2 drops T-12 at 80° C. for 3 hrs 30 min in a reaction flask equipped with mechanical stirrer, thermometer, and a reflux condenser. Then 4.5 g of N-methyldiethanol amine was added and reacted further for 1 hr and 30 min. To this prepolymer 10 g of the hydroxy containing monol biocidal quaternary compound INCROMINE-SB as prepared above was added and was further reacted for 2 hr 30 min. The reaction product was then dispersed using Omni homogenizer in 200 g of water containing 2.27 g of acetic acid and 11 g of adipic acid dihydrazide. The resulting dispersion was heated for 8 hours at 40° C. A milky white dispersion was obtained. The polymer had a cationic stabilizing group equivalent weight of 747 g polymer/equivalent and an antimicroibal quaternary ammonium group equivalent weight of 2825 g polymer/equivalent.

Examples 1 and 3, having two different covalently bound biocidal quaternary ammonium groups, demonstrated that they are capable of killing algae. Concentration of microorganisms in broth culture can be measured spectrophotometrically by monitoring absorbance. Increases in absorbance are associated with increases in cell density. Absorbance in algal cultures rarely goes to zero due to extracellular matrix and other materials in the culture. Therefore, it was considered that the algae were killed when the absorbance value was less than 0.15. (i.e. if the absorbance reading were between 0.15 and the control absorbance, growth was inhibited, due to some of the algae being killed.) These tests were carried out as given below:

Accelerated algae test procedure: Coatings were applied to the lower half of each flask (Tissue culture Treated polystyrene, obtained from Corning Inc., Corning, N.Y.), cured at 47° C. for 4 hours, then aerated overnight, rinsed three times with sterile water, and inoculated with Neochloris algae (obtained from the roofing shingles in Florida) after adding the following medium:

| Component | Weight (g/liter) |
| --- | --- |
| Ammonium Nitrate | 0.71 |
| Potassium dihydrogen phosphate | 0.68 |
| Disodium hydrogen phosphate | 0.71 |
| Magnesium sulfate heptahydrate | 0.075 |
| Sodium carbonate | 0.02 |
| Calcium chloride dihydrate | 0.027 |
| Ferric chloride heptahydrate | 0.00054 |
| Microstock | 1 ml |

Where "microstock" is the following:

| Component | Weight (g/l) |
| --- | --- |
| Boric acid | 1.43 |
| Zinc sulfate heptahydrate | 0.11 |
| Sodium molybdate dihydrate | 0.195 |
| Copper sulfate pentahydrate | 0.04 |
| Cobalt nitrate | 0.025 |
| Manganese chloride tetrahydrate | 0.9 |

After 7 days of growth, absorbance of the cultures was measured using an UV/V is spectrophotometer at 480 nm to determine degree of growth of the algae. Three readings were taken for each example and then averaged. Readings of less than 0.15 is considered complete kill. The results are reported in table 1.

TABLE 1

| | Absorbance 480 nm | | |
| --- | --- | --- | --- |
| | Mean | STDEV | Result |
| Example #1 | 0.03 | 0.015 | complete kill |
| Example #3 | 0.07 | 0.028 | complete kill |
| Example #2 (Comparative) | 0.633 | 0.090 | growth |

The films obtained from dispersions of Examples 1 and 3 were very hydrophobic, however, prolonged immersion of films in the water caused them to absorb some water. Nevertheless, these films lost water quickly when they were removed from the water. The water absorption affinity of films depends on the concentration of low molecular weight solubilizing salt and types of soft segments in the prepolymer chain. The following test method is to determine the water absorption of film;

Films according to Examples 1 and 3 were prepared at room temperature using a degassed sample of the dispersion on a polyester backing using a tape mold, i.e., a mold was made on release liner using masking tape of 0.07 mm thickness. These films were allowed to dry overnight at room temperature for 16 hours, followed by 1 day at 50° C., and then 1 day at 65° C. The film was allowed to cool for a day before it was removed from the polyester backing. Six sample pieces (0.5"×2.0") were cut. The samples were weighed and fully immersed in deionized water at room temperature. After one day immersion, three of these samples were removed, patted dry using Kim-wipes and weighed again. The increase in mass was reported as a percentage increase due to water absorption. These steps were repeated for the remaining three samples after seven days. 7 days water absorption of example-4 is 10.5%.

Determination of Tack-Free Time of the Film:

Films obtained from the dispersion of Examples 1 were considered tack free, when the film did not show any tackiness upon finger touch, i.e. no material was transferred to the finger.

The film for this test was prepared at 20° C. (68° F.) and 50.5% relative humidity. It was observed the following tack free time:

53 minutes for a film of 0.0635 mm 1 hr 38 minutes for a film 0.1397 mm

Example 4

The Example was prepared similar to the procedure as given for Example 1. An isocyanate terminated prepolymer was first prepared by reacting 1.2 g 1, 6 hexane idol, 36 g Priplast3196, 20 g STEPANOL PH-56, 36 g DESMODUR-W, 2 drops of T-12, 5 g N-methylpyrrolidone (NMP) for 2 hrs 30 min at 80° C. Then 4.5 g N-MDEA was reacted for another 1.5 hour. This isocyanate terminated prepolymer was then partly chain terminated with 3.0 g hydroxyethylacrylate (HEA) by reacting for another 1.5 hrs. Then the temperature was reduced to 65° C. and 10 g of DMAEMA-C-8 salt (prepared in a similar manner as Example 1 using 1-bromooctane) was added dissolved in a mixture of 5 g NMP and 20 g MEK along with 0.0647 g of VAZO-52. The solution was polymerized for total six hours by adding another two batches 0.0650 g VAZO-52, dissolved in 1 g of NMP,) at a 2 hour intervals.

The 180 g of this resulting product was dispersed in 170 g water containing 1.94 g of acetic acid. Then it was chain extended with 8.39 g of adipic acid dihydrazide at 40° C. for 8 hours. The polymer had a cationic stabilizing group equivalent weight of 1318 g polymer/equivalent and an antimicroibal quaternary ammonium group equivalent weight of 4641 g polymer/equivalent.

Example 5

The present Example was prepared exactly similar to Example 4, except 5 g of DMEMA-C16 salt was used. The polymer had a cationic stabilizing group equivalent weight of 1324 g polymer/equivalent and an antimicroibal quaternary ammonium group equivalent weight of 9,154 g polymer/equivalent.

Mechanical properties of Examples 4 and 5 were measured using an Instron, model 1123 modified to 4400R (Inston Corporation Canton, Mass.) at a crosshead speed of 200 mm/min. The sample thickness was approximately 0.22 mm and the cross sectional area of the films were average 1.37 mm$^2$.

|           | Tensile (psi) | Elongation (%) |
|-----------|---------------|----------------|
| Example 4 | 2310          | 256            |
| Example 5 | 1096          | 196            |

Example 6

The present Example was prepared similar to Example 5 without any quaternary ammonium salt.

Example 7

The Example was prepared similar to Example 4, except the prepolymer was prepared from 33 g TEGO-HSI-2311, 0.25 g TMP, 26 g of PRIPLAST-3192, 26 g DESMODUR-W. To this prepolymer 1.5 g of HEA was added, then 3 g of DMAEMAC-16 salt was used with Vazo-52 and polymerized as above. The polymer had a cationic stabilizing group equivalent weight of 1207 g polymer/equivalent and an antimicrobial quaternary ammonium group equivalent weight of 15, 208 g polymer/equivalent.

Example 8

This Example illustrates the preparation of polyurethane terminated in biocidal quaternary groups (alkyl amidopropyl dialkyl quaternary ammonium-alkyl-O-carbamato-N-ethyl Methacrylate (IEMA-Incromine-R—Br)).

The quaternary ammonium biocidal vinyl functional salt was prepared from the reaction product of isocyanatoethylmethacrylate and an alkylamidopropyldialkyl quaternary ammonium alkanol.

First, an alkylamidopropyldialkyl quaternary ammonium alkanol (Incromine-SB reacted with 2 bromoethanol to form the hydroxyethyl adduct (Incromine SB-OH)) was prepared as in example 3. Then, the biocidal acylate quaternary ammonium salt of this (IEMA-Incromine-) was prepared as follows: 10 g of Incromine SB-OH, 30 g of Methyl Ethyl Ketone, 10 g of N-Methyl pyrrolidone (NMP) and 0.0013 g of hydroquinone were charged to a three necked flask equipped with a reflux condenser, stirrer and a thermometer. To this mixture, 3.12 g of isocyanatoethylmethacrylate (IEMA) in 10 g of Methyl Ethyl Ketone (MEK) was added drop wise over a period of 1 hour at room temperature. The flask was heated at 70° C. and a drop of dibutyl tin dilaurate was added and reacted for another 3 hours and 20 minutes. Infra red data showed complete disappearance of isocyanate peak ~2100 cm$^{-1}$.

Next, an isocyanate-terminated prepolymer was prepared as given below: 51 g of Priplast-3192, mol. Wt of 2000, 8 g of Tone 0210, m.wt. of 830, 0.25 g of Timethylol propane, 10 g of N-Methyl pyrrolidone and 31 g of Desmodur-W were added in a resin reactor fitted with a condenser, stirrer, and a thermometer. The mixture was heated at 80° C. and mixed for 30 minutes and 2 drops of dibutyl tin dilaurate was added and reacted for 2 hours. Then 4.5 g of N-methyl diethanolamine was added and reacted for further 2 hours.

1.5 g of hydroxy ethyl acrylate was added to this isocyanate terminated prepolymer and reacted for 1 hour and 45 minutes to end cap a small portion of isocyanate. The temperature of the above partial end capped prepolymer was reduced to 60° C., and nitrogen was bubbled through. 4.24 g of IEMA-IncromineSB acrylate antimicrobial quat was added to this prepolymer with 0.0689 g of Vazo-52 dissolved in 1 g of NMP and reacted for 2 hours, then the reaction was continued for another 2 hours after addition of 0.0180 g of Vazo-52.

The 80 g of the above reaction product was dispersed in 155 g of water containing 3.61 g of adipic acid dihydrazide and 1.52 g of glacial acetic acid by rotor-stater homogenizer for 20 minutes. Then the resulting dispersion was further mixed at 1500 rpm at 40° C. for 6 hours. A milky white dispersion was obtained. A film was produced by pouring the dispersion on a mould and allowed the water to evaporate. The cured film after 7 days water immersion showed 14.8% water absorption. The polymer had a cationic stabilizing group equivalent weight of 1273 g polymer/equivalent and an antimicroibal quaternary ammonium group equivalent weight of 14,808 g polymer/equivalent.

Antimicrobial Test Procedure: The experiments were carried out in tissue culture wells, "Costar" (6 well Tissue Culture treated polystyrene obtained from Corning Incorporated) that hold about 10 ml of medium. There were 6 wells to a plate. The bottoms of the wells were coated with the polymer coatings of thickness approximately 0.05 mm, cured, washed with 1:1 methanol, and then thoroughly with sterilized water. Then the medium, a mineral nutrient for algae growth (see accelerated algae test procedure) or a tryptic soy broth (Difco) for bacterial growth was added to the wells. "Inserts" were added to three wells and three wells were left without inset. Then the medium was inoculated with algae (Neochloris algae, obtained from the roofing shingles in Florida) or with bacteria (*Escherichia Coli* ATCC 25922). An "insert" is a sleeve that fits inside the well and one end of this sleeve (the bottom) was fitted with a polycarbonate membrane with pore size of 0.2 micrometers or less (obtained as part No. from Nunc Inc). Thus, no cells can penetrate this membrane but anything soluble freely moves in and out of the insert. In the wells with inserts (medium was inside the insert as well as outside the insert) the algae or bacteria were inoculated inside the inserts so that there were no algae or bacteria outside the inserts. In wells without inserts, the algae were inoculated directly into medium in the well and these algae or bacteria were in contact with the coatings. The results for Examples 4-8 are shown in Table 2. Examples 4-7 were challenged with bacteria. Example 8 was challenged with algae.

TABLE 2

| | Absorbance 480 nm | | | | |
|---|---|---|---|---|---|
| | Well w/o insert | | Inside the insert | | |
| Samples | Mean | STDEV | Mean | STDEV | Result |
| No coatings (Bacteria) | 2.35 | 0.01 | 2.53 | 0.02 | growth |
| Example 6 (Control) | 1.03 | 0.65 | 2.42 | 0.05 | growth |
| Example 7 | 0.32 | 0.40 | 2.50 | 0.02 | kill w/o leaching |
| Example 4 | 0.65 | 0.53 | 2.36 | 0.03 | kill w/o leaching |

TABLE 2-continued

| | Absorbance 480 nm | | | | |
|---|---|---|---|---|---|
| | Well w/o insert | | Inside the insert | | |
| Samples | Mean | STDEV | Mean | STDEV | Result |
| Example 5 | 0.49 | 0.41 | 2.43 | 0.01 | kill w/o leaching |
| Example 8 | 0.17 | 0.04 | 0.69 | 0.02 | kill w/o leaching |
| No coatings (Algae) | 0.79 | 0.03 | 0.58 | 0.05 | growth |

Average of 3 readings

Example 9

This example illustrates polymer bound biocidal quaternary ammonium salt dissolved in non-aqueous solvent A diisocyanate terminated prepolymer was first made by charging 7.5 g of PC-1122, a 2000 molecular weight polycarbonate diol, obtained from Stahl USA, Peabody, Mass., 3.74 g of PH-56, 0.11 g of neopentyl glycol, 70 g of acetone, 10 g of NMP, 0.22 g of Naugard-445, and 0.1 g of Tinuvin 292 in a flask equipped with stirrer, nitrogen inlet and out-let and a thermometer. The contents of the flask were mixed for 10 minutes at 80° C. then 7.1 g of Desmodur-W was added followed by 0.01 g of T-120 (a tin mercaptide catalyst), obtained from Air Products, Allentown, Pa. The mixture was reacted for 2 hours and 10 minutes at 80° C. Then 0.76 g of N-methyldiethanolamine with 46 g of acetone was added and reacted for 1 hour and 10 minutes.

0.65 g of hydroxy ethyl methacrylate and 0.0005 g of hydroquinone were added and further reacted for an hour to the resulting isocyanate terminated prepolymer to partially end cap. Then 0.73 g of dimethyl sulfate and 45 g of acetone were added and reacted for 45 minutes. To this 0.2 g of Silane A-1170, obtained from Union Carbide was added and reacted for another 30 minutes.

The temperature of the flask was reduced to 60° C. followed by the addition of 4 g of DMAEMAC-16 salt (prepared as in Example 1) dissolved in a mixture of 10 g of N-methylpyrrolidone and 10 g of acetone. The acrylate polymerization was carried out with 0.0349 g of AIBN in 1 g of NMP. The reaction mixture was further diluted with 25 g of acetone. 0.0171 g of AIBN dissolved in 2 g of NMP was added 2 hours after the initial addition of AIBN, followed by 0.0181 g of AIBN in 20 g of acetone after another 2 hours. The polymerization was carried out for total 6 hours.

This quat-functional prepolymer was added to isopropyl alcohol containing 0.3 g of ethylene diamine. After complete addition with good mixing, an additional 0.3 g of EDA was added. A clear solution was obtained. The polymer had a cationic stabilizing group equivalent weight of 1555 g polymer/equivalent and an antimicrobial quaternary ammonium group equivalent weight of 2309 g polymer/equivalent.

Example 10

This example illustrates preparation of polyurethane prepolymer containing a polyol vinyl compound having a two hydroxyl groups(e.g. glyceryl monomethacrylate), the vinyl group is further polymerized with a the antimicrobial vinylic quaternary ammonium compound N,N-dimethyl N-hexadecyl-N ethyl methacrylate ammonium bromide salt.

The composition was prepared first by charging 38.01 g (0.0608 eq) of Tone 0230, 12 g (0.0288 eq) of Tone 0210 both available from Union Carbide, and 10 g of N-methylpyrrolidone (NMP), obtained from BASF corporation in a reaction flask equipped with stirrer, condenser, thermometer and nitrogen inlet and outlet at 80° C. and then 40.2 g (0.3068 eq) of Desmodur-W, available from Bayer corporation, 5 drop (0.015 g) of T-120 catalyst, available from Air Products and reacting for an hour, further reacting another hour with 3.99 g (0.0670 eq) of N-methyldiethanol amine. The temperature was reduced to 70° C. and 2.0 g (0.0212 equivalence) of glyceryl monomethacrylate, available from Monomer-Polymer & Dajec Laboratories, Inc. (Feasterville, Pa.), along with 0.004 g of hydroquinone, available from Aldrich, dissolved in 10 g of methyl ethyl ketone, was added and the reaction was continued for another hour. Then 1 g (0.0029 moles) of Silane A-1170, available from Union Carbide was added and reacted for another 1 hour. At each stage, the completion of the reaction was determined by determining the excess NCO by standard titration procedure using excess dibutyl amine and back titrating the excess dibutyl amine after reaction with HCl.

To this vinyl containing prepolymer, which is endcapped with silane, 10 g of N,N-dimethyl N-hexadecyl-N ethyl methacrylate ammonium bromide salt dissolved in a mixture of 10 g of NMP and 50 g of MEK was added and mixed for 5 minutes at 50+/−2° C., and then 0.1 g of Vazo-52 dissolved in 1 g of NMP was added and the reaction was carried out for 2 hours at 52° C. Then two more portions of Vazo-52, each 0.012 g were added at an interval of 2 hours to complete the polymerization. After that, N-MDEA was quaternized with 4.23 g of dimethyl sulfate, available from Aldrich for 1 hour.

206.5 of the resulting polyurethane prepolymer containing quat was simultaneously dispersed and chain extended in 190 g of water with 3.2 g of ethylenediamine and was dispersed in a Rotor-Stator homogenizer using a Omni mixer for 5 minutes and further homogenized at a 4000 psi using a Microfluidics homogenizer, available from Microfluidics International Corporation, for another 5 minutes. A milky white dispersion was obtained having particle size of 458 nm, measured by a Zeta Plus potential analyzer, from Brookhaven Instruments Corporation and solids of 22.1%. The polymer had a cationic stabilizing group equivalent weight of 1451 g polymer/equivalent and an antimicroibal quaternary ammonium group equivalent weight of 4500 g polymer/equivalent.

Example 11

This example illustrates preparation of polyurethane prepolymer containing a polyol vinylic compound having two active hydrogen groups (hydroxyl groups), Glyceryl monomethacrylate), a monol quaternary biocidal compound, and polymerization of the vinyl group on the polyolvinylic compound with an antimicrobial quaternary ammonium vinylic compound (N,N-dimethyl N-hexadecyl-N ethyl methacrylate ammonium bromide salt).

The prepolymer was prepared similarly to Example 10 with 50 g of PH-56, 6 g (0.0226 eq) of Tone 0200, 4 g N-MDEA, 37 g Des-W, 2 g glyceryl monomethacrylate, 1 g A-1170 and 10 g of NMP. The prepolymer was further carried out at 76° C. for 1 hour 45 minutes with 5 g ((0.010 eq) of monol quat (hydroxyethylIncromine SB, as described in ex-1) dissolved in a mixture of 5 g NMP and 30 g MEK) and then 5 g of N,N-dimethyl N-hexadecyl-N ethyl methacrylate ammonium salt was added with a mixture of 5 g of NMP and 10 g of MEK and polymerized for 6 hours at 52° C. as above with 0.0599 g of Vazo-52, added in three portions. Then 148 g of prepolymer containing two type of antimicrobial quaternary ammonium moeities was dispersed and chain extended in 190 g of water with 2.97 g of EDA and homogenized as above, A milky white dispersion was obtained having particle size of 475 nm and solids of 21.3%. The polymer had a cationic stabilizing group equivalent weight of 1488 g polymer/equivalent and an antimicroibal quaternary ammonium group equivalent weight of 3527 g polymer/equivalent.

Example 12

This example illustrates the preparation of water soluble covalently bonded quat polymer. This was carried out by charging 38.2 g of Variquat K-1215, available from Witco Corporation, 26.07 g of Isophorone diisocyanate, available from Huls Corporation USA, 10.85 g of acetone in a flask equipped with condenser, stirrer, thermometer, and nitrogen inlet and outlet, reacting at 75° C. for 1 hour. Then 38.4 g Carbowax PEG 1000, available from Union Carbide was added and reacted at 80° C. for 45 minutes. Then 10.32 g of monol quat (Stearamidopropyl-N,N dimethyl-N hydroxyethylammonium bromide ("hydroxyethyl-Incromine SB), as prepared in ex-3) along with 40 g of methyl ethyl ketone was added and reacted for 3 hours at 80° C. and further reacted for 2 hours at 70° C. with additional 20 g of MEK. Then 20 g of prepolymer, thus covalently attached quat was dispersed and chain extended in 300 g of water containing 0.1 g EDA, using a Rotor Stator homogenizer as described above. The dispersion was mixed for another 4 hours. A colorless dispersion was obtained.

MEK was removed from the dispersion, first in a vacuum oven for 30 minutes and then by heating at 55° C. for 4 hours using a Rota Vapor. The polymer concentration was adjusted to 10% by weight. The polymer had a cationic stabilizing group equivalent weight of 1209 g polymer/equivalent and an antimicroibal quaternary ammonium group equivalent weight of 4910 g polymer/equivalent.

The polymer solution was tested for antimicrobial activity by the following method: *Staphylococcus aureus* ATCC 14154 was cultured on a 5% sheep blood agar plate. A suspension of this organism was made in phosphate buffered saline using a Klett-Summerson photoelectric meter to a target concentration of approximately $1.0 \times 10^9$ colony forming units/milliliter (CFU/mL). A 1:10 dilution was made of this suspension in phosphate buffered saline to obtain approximately $1.0 \times 10^8$ CFU/mL.

Test solutions were made with the polymeric quaternary sample by diluting 1:10 (1% solids) and 1:40 (0.25% solids) in sterile water to a final volume of 10 mL. The diluted test solutions were inoculated with 0.1 mL of the organism suspension so that the test solution contained approximately $1.0 \times 10^6$ CFU/mL. Ten mL of phosphate buffered saline was also inoculated with organism which was used as a growth control. The tubes were mixed by vortexing and kept at room temperature during the test.

At 6 hours and 24 hours after test solution inoculation, a 1.0 mL aliquot from each test sample was transferred to 9.0 mL Dey Engley Neutralizing Broth. The samples were serially diluted in phosphate buffered saline and pour plates were prepared from the appropriate dilutions using Tryptic Soy Agar. Plates were incubated at 37° C. for 48 hours and the numbers of colony forming units were determined according to standard microbiological methods.

Results

No organisms were recovered at 6 hours for either dilution of the test suspension. For this reason, testing was not performed at 24 hours. The PBS growth control grew 6.13 logs of bacteria.

| Organism | Time | Log Reduction for 1:10 dilution | Log Reduction for 1:40 dilution |
|---|---|---|---|
| S. aureus (1.35 × 10⁶) | 6 hours | 6.13* | 6.13* |

*no surviving bacteria (<10 CFU/mL)

The above specification, examples and data provide a complete description of the manufacture and use of the composition of the invention. Since many embodiments of the invention can be made without departing from the spirit and scope of the invention, the invention resides in the claims hereinafter appended.

We claim:

1. A polymeric composition comprising a polyurethane polymer derived from a polyisocyanate compound and a polyactive hydrogen compound, said polyurethane having an effective amount of covalently bound, antimicrobially active ammonium groups pendant to the polyurethane polymer in a terminal position and/or as a side chain along the polyurethane polymer backbone, wherein the antimicrobially active ammonium group is derived from a compound of the formula (I):

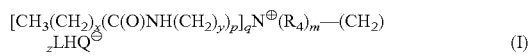

(I)

wherein:
m is 1 or 2;
p is 1;
and q=1 or 2 provided that m+q=3;
x is 6 to 20;
y is 2-8;
z is 2-10;
L is O, S, $NR_5$ or NH; where $R_5$ is $C_{1-4}$ alkyl or benzyl;
each $R_4$ is independently $C_{1-4}$ alkyl, phenyl or $C_{6-8}$ aralkyl; and
$Q^\ominus$ is halogen, alkyl sulfate, or carboxylate, sulfonate, sulfate, phosphonate or phosphate;
or
an alkylaminoacrylate compound of the formula (II):

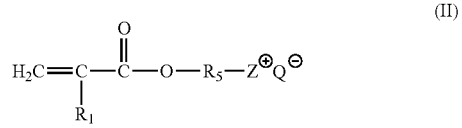

(II)

wherein:
$R_1$ is H or $CH_3$;
$R_5$ is a $C_{2-8}$ alkylene;
$Q^\ominus$ is a halogen, alkyl sulfate, alkylsulfonate or carboxylate;
$Z^\oplus$ is $-N^\oplus(R_4)_2R_3, -N^\oplus R_4(R_3)_2$,

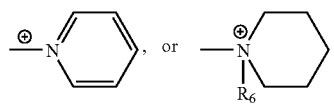

, or wherein:
$R_3$ is $C_{8-20}$ alkyl, benzyl, or substituted benzyl;
each $R_4$ is independently $C_{1-4}$ alkyl, phenyl or $C_{6-8}$ aralkyl; and
$R_6$ is H or $C_{1-4}$ alkyl.

2. The polymeric composition of claim 1, wherein the antimicrobial quaternary ammonium group is derived from a compound of formula (I) and is an alkylamidopropyldimethylhydroxyalkyl ammonium salt.

3. The polymeric composition of claim 1, wherein the polyurethane polymer comprises a cationic stabilizing moiety.

4. The polymeric composition of claim 1, wherein the at least one antimicrobial quaternary ammonium group is derived from an alkylaminoacrylate compound of the formula (II) and is located on an addition polymerized group and wherein said polyurethane polymer is derived from a monol vinylic compound and wherein the total equivalents of isocyanate used to form said polyurethane polymer is greater than the equivalents of active hydrogen groups contributed by said polyactive hydrogen compound used to form said polyurethane polymer and said monol or polyol vinylic compound, and the addition polymerization group is formed by reaction of said monol or polyol vinylic compound with a vinylic compound having at least one antimicrobial quaternary ammonium group and wherein said monol vinylic compound is selected from allyl alcohol, allyl amine, or a hydroxyalkyl acrylic compound of the formula:

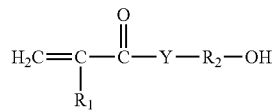

wherein:
Y is O or NH;
$R_1$ is H or $CH_3$;
$R_2$ is a $C_{2-8}$ alkylene;
or mixtures thereof.

5. The polymeric composition of claim 4, wherein the monol vinylic compound is hydroxyethylmethacrylate or hydroxyethylacrylate.

6. The polymeric composition of claim 1, wherein the alkylaminoacrylate compound of the formula (II) is selected from the group of N,N-dimethyl-N-alkyl-N-alkylmethacroyl ammonium salts such as N,N-dimethyl-N-dodecyl-N-ethylmethacroyl salt, N,N-dimethyl-N-hexadecyl-N-ethylmethacroyl salt, N,N-dimethyl-N-benzyl-N-lauroylmethacoryl salt, N,N-dimethyl-N-(2,4-dichlorobenzyl)-N-ethylmethacroyl salt, N,N-diethyl-N-hexadecyl-N-ethylmethacroyl salt, wherein the counter ion is selected from chloride, bromide, iodide, $C_{1-4}$ alkyl sulfate, sulfate, or carboxylate.

7. An article comprising a substrate coated with the polymeric composition according to claim 1.

8. A polymeric composition comprising a polyurethane polymer derived from a polyisocyanate compound and a polyactive hydrogen compound, said polyurethane having an effective amount of covalently bound, antimicrobially active ammonium groups pendant to the polyurethane polymer in a terminal position and/or as a side chain along the polyurethane polymer backbone, wherein the antimicrobially active ammonium group is derived from a compound of the formula (III):

(III)

wherein:
m is 1 or 2;
q=1 or 2 provided that m+q=3;
x is 6 to 20;
z is 2-10;
L is O, S, $NR^5$ or NH; where $R^5$ is $C_{1-4}$ alkyl or benzyl;
each $R^4$ is independently $C_{1-4}$ alkyl, phenyl or $C_{6-8}$ aralkyl; and
$Q^{\ominus}$ is halogen, alkyl sulfate, or carboxylate, sulfonate, sulfate, phosphonate or phosphate.

* * * * *

UNITED STATES PATENT AND TRADEMARK OFFICE
CERTIFICATE OF CORRECTION

| | | |
|---|---|---|
| PATENT NO. | : 7,459,167 B1 | Page 1 of 4 |
| APPLICATION NO. | : 09/626026 | |
| DATED | : December 2, 2008 | |
| INVENTOR(S) | : Sengupta et al. | |

It is certified that error appears in the above-identified patent and that said Letters Patent is hereby corrected as shown below:

<u>Title page</u>
Item (54), and Column 1, Line 2, delete "METHODS" and insert in place thereof
--METHOD--.
Item (56), References Cited, under OTHER PUBLICATIONS, Line 6, delete "Polyuretyhane" and insert in place thereof --Polyurethane--.
Item (57) ABSTRACT, Line 10, delete "algae fungi" and insert in place thereof --algae, fungi--.

<u>Column 2</u>
Line 45, delete "Zerewitnoff" and insert in place thereof --Zerewitinoff--.

<u>Column 4</u>
Line 23, delete "group" and insert in place thereof --groups--.
Line 28, delete "or" and insert in place thereof --of--.

<u>Column 7</u>
Line 23, delete "Final" and insert in place thereof --final--.
Lines 40-41, delete "1,4-diisocyanatocy-clohexame," and insert in place thereof
--1,4-diisocyanatocyclohexane,--.
Line 46, delete "α,α,α'-,α'" and insert in place thereof -- α,α,α',α'--.

<u>Column 8</u>
Line 36, delete "isophalic" and insert in place thereof --isophthalic--.

<u>Column 9</u>
Line 1, delete "$CH_2CH_2N(CH_2CH_2X)$," and insert in place thereof --$CH_2CH_2N(CH_2CH_2X)_2$,--.
Line 5, delete "$C(O))_LR_4$" and insert in place thereof --$(C(O)_LR_4$--.

<u>Column 10</u>
Lines 23-24, delete "1,4 butylene" and insert in place thereof --1,4-butylene--.

Signed and Sealed this
Sixteenth Day of October, 2012

David J. Kappos
*Director of the United States Patent and Trademark Office*

Line 34, delete "acylate." and insert in place thereof --acrylate.--.
Line 35-36, delete "polyisocyante" and insert in place thereof --polyisocyanate--.

Column 11
Line 10, delete "N,N',N"trimethyl" and insert in place thereof --N,N',N"-trimethyl--.
Lines 23-24, delete "alkldimethylammoniumhydrodoxypropylpropylether" and insert in place thereof --alkyldimethylammoniumhydroxypropylpropylether--.
Lines 26-27, delete "(1,1 dipropyloleate,2,2 dihydroxypropyl 2methyl" and insert in place thereof --(1,1-dipropyloleate, 2,2-dihydroxypropyl-2-methyl--.
Line 55, delete "compounds When" and insert in place thereof --compounds. When--.

Column 12
Line 13, delete "hihydroxy" and insert in place thereof --dihydroxy--.
Line 17, delete "useful" and insert in place thereof --useful.--.
Line 61, delete "diluaurate," and insert in place thereof --dilaurate,--.
Line 62, delete "diocytl-tin" and insert in place thereof --dioctyl-tin--.

Column 14
Line 48, delete "p=0-6" and insert in place thereof --p=0-6.--.
Lines 65-66, delete "6 bromohexyanol, 8 bromooctanol," and insert in place thereof --6-bromohexanol, 8-bromooctanol,--.

Column 15
Line 2, delete "stearamidoproyl" and insert in place thereof --Stearamidopropyl--.

Column 16
Line 11, delete "alkylnene" and insert in place thereof --alkylene--.
Line 30, delete "lauroylmethacoryl" and insert in place thereof --lauroylmethacroyl--.
Line 34, delete "C1-4" and insert in place thereof --$C_{1-4}$--.

Column 17
Line 4, delete "thereof," and insert in place thereof --thereof;--.
Line 12, delete "Uniroyl" and insert in place thereof --Uniroyal--.
Line 12, delete "out door" and insert in place thereof --outdoor--.
Line 23, delete "acylate" and insert in place thereof --acrylate--.

Column 18
Line 12, delete "2.2.2octane)," and insert in place thereof --2.2.2 octane),--.
Line 35, delete "Microfludics" and insert in place thereof --Microfluidics--.

Column 19
Line 3, delete "indwelling" and insert in place thereof --in-dwelling--.
Line 51, delete "Ketone" and insert in place thereof --Ketone.--.
Line 64, delete "acrylate" and insert in place thereof --acrylate.--.

CERTIFICATE OF CORRECTION (continued)

Column 20
Line 4, delete "adiptic" and insert in place thereof --adipic--.
Line 5, delete "PRIPPLAST" and insert in place thereof --PRIPLAST--.
Line 29, delete "Denkok. K.," and insert in place thereof --Denko K.K.,--.
Line 31, delete "Products" and insert in place thereof --Products.--.
Line 33, delete "Carbide" and insert in place thereof --Carbide.--.

Column 21
Lines 23-24, delete "antimicroibal" and insert in place thereof --antimicrobial--.
Line 33, delete "10 g g" and insert in place thereof --10 g--.
Line 45, delete "alkanolamine" and insert in place thereof --alkanolamine.--.

Column 22
Line 3, delete "antimicroibal" and insert in place thereof --antimicrobial--.

Column 23
Line 7, delete "film;" and insert in place thereof --films.--.
Line 42, delete "Priplast3196," and insert in place thereof --Priplast 3196,--.
Lines 59-60, delete "antimicroibal" and insert in place thereof --antimicrobial--.

Column 24
Line 1, delete "antimicroibal" and insert in place thereof --antimicrobial--.
Line 5, delete "(Inston" and insert in place thereof --(Instron--.
Line 49, delete "acylate" and insert in place thereof --acrylate--.
Line 64, delete "Timethylol" and insert in place thereof --Trimethylol--.

Column 25
Line 10, delete "IncromineSB" and insert in place thereof --Incromine SB--.
Line 16, delete "rotor-stater" and insert in place thereof --rotor-stator--.
Line 24, delete "antimicroibal" and insert in place thereof --antimicrobial--.

Column 26
Line 62, delete "groups(" and insert in place thereof --groups (--.

Column 27
Line 11, delete "Dajec" and insert in place thereof --Dajac--.
Line 22, delete "N,N-dimethyl N-hexadecyl-N ethyl" and insert in place thereof --N,N-dimethyl-N-hexadecyl-N-ethyl--.
Line 43, delete "antimicroibal" and insert in place thereof --antimicrobial--.

Column 28
Line 1, delete "moeities" and insert in place thereof --moieties--.
Line 6, delete "antimicroibal" and insert in place thereof --antimicrobial--.
Line 35, delete "antimicroibal" and insert in place thereof --antimicrobial--.

Column 30
Lines 51-52, delete "lauroylmethacoryl" and insert in place thereof --lauroylmethacroyl--.